United States Patent
Wang et al.

(10) Patent No.: US 11,136,421 B2
(45) Date of Patent: Oct. 5, 2021

(54) SOLID CATALYST COMPONENT FOR USE IN OLEFIN POLYMERISATION, CATALYST, AND APPLICATION THEREOF

(71) Applicant: BEIJING LIHE TECHNOLOGY LTD, Beijing (CN)

(72) Inventors: Zhiwu Wang, Beijing (CN); Shuhang Li, Beijing (CN); Huashu Li, Beijing (CN); Junwei Zhang, Beijing (CN); Le Hu, Beijing (CN); Jinsong Dai, Beijing (CN); Qingli Ma, Beijing (CN); Yong Gao, Beijing (CN); Hao Chen, Beijing (CN); Wenjie Jiao, Beijing (CN)

(73) Assignee: BEIJING LIHE TECHNOLOGY LTD, Beijing (CN)

( * ) Notice: Subject to any disclaimer, the term of this patent is extended or adjusted under 35 U.S.C. 154(b) by 0 days.

(21) Appl. No.: 16/566,719

(22) Filed: Sep. 10, 2019

(65) Prior Publication Data

US 2020/0071430 A1  Mar. 5, 2020

Related U.S. Application Data

(63) Continuation of application No. PCT/CN2018/077870, filed on Mar. 2, 2018.

(30) Foreign Application Priority Data

Mar. 10, 2017 (CN) .............................. 20170140601.6
Mar. 10, 2017 (CN) ............................. 20170144264.8

(51) Int. Cl.
*C08F 10/06* (2006.01)

(52) U.S. Cl.
CPC .......... *C08F 10/06* (2013.01); *C08F 2410/01* (2013.01)

(58) Field of Classification Search
CPC ............................. C08F 10/06; C08F 2410/01
See application file for complete search history.

(56) References Cited

U.S. PATENT DOCUMENTS

| | | |
|---|---|---|
| 5,468,704 A | 11/1995 | Morini et al. |
| 2013/0197172 A1* | 8/2013 | Collina .................. C08F 10/06 526/123.1 |

FOREIGN PATENT DOCUMENTS

| | | | |
|---|---|---|---|
| WO | 1999011677 | 3/1999 | |
| WO | 2016184884 | 11/2016 | |
| WO | WO-2017050870 A1 * | 3/2017 | ........... C07C 233/75 |

* cited by examiner

*Primary Examiner* — Catherine S Branch
(74) *Attorney, Agent, or Firm* — Yong Chen

(57) ABSTRACT

Provided in the present invention is a solid catalyst component for use in olefin polymerisation, comprising Mg, Ti, a halogen, and at least one electron donor, the electron donor being a 2-substituted amino-phenyl ester compound selected from general formula (I). Also disclosed in the present invention are a catalyst comprising the solid catalyst component, and an application for the catalyst in olefin polymerisation, particularly in propylene polymerization. Also provided in the present invention is a high activity catalyst, said catalyst being able to obtain polypropylene of high isotacticity and wide molecular weight distribution, and not requiring an external electron donor to obtain high isotacticity polypropylene; during polymerization, Al/Ti and Al/Si are reduced, the polymerization time is lengthened, and high activity can still be maintained, suitable for producing low-ash polymers.

14 Claims, No Drawings

SOLID CATALYST COMPONENT FOR USE IN OLEFIN POLYMERISATION, CATALYST, AND APPLICATION THEREOF

TECHNICAL FIELD

The present invention relates to a solid catalyst component for $CH_2=CHR$ olefin polymerization, where R is hydrogen or hydrocarbon group having 1 to 12 carbon atoms, and more particularly, the present invention relates to a solid catalyst component containing at least one 2-substituted amino-phenyl ester compound, a catalyst containing the solid catalyst component and the use of the catalyst in olefin polymerization, particularly in propylene polymerization.

BACKGROUND ART

In the propylene polymerization industry, the most widely studied and widely used catalyst is the Ziegler-Natta catalyst, which is prepared by adding an internal electron donor during the titanium loading of the active magnesium chloride support. Since the internal electron donor can change the performance of the catalyst to the greatest extent, research and search for the ideal internal electron donor compound have become the focus and hotspot of Z—N catalyst research. At present, research on internal electron donors in China and abroad mainly focuses on: 1) traditional fatty acid esters and aromatic acid ester compounds, the representative are phthalate compounds; 2) diether compounds (e.g. EP0361493, EP0728724) 3) succinate compounds (e.g. WO9856834, WO0063261, WO03022894); 4) diol ester compounds (e.g. WO9856834, WO0063261, WO03022894); 5) compounds with other functional groups (CN1105671, CN1242780, US20060128558) and the like.

However, in practical applications, the above compounds have certain problems in serving as internal electron donors for catalysts for olefin polymerization, for example, the catalysts obtained by using binary aromatic carboxylate compounds as internal electron donors are not highly active, the prepared polypropylene (PP) has a narrow relative molecular mass distribution, and phthalate compounds as commonly used plasticizer are very harmful to human reproductive health and the environment; the activity of the catalyst obtained by using 1,3-diether compounds as internal electron donor is high and the hydrogen sensitivity of the catalyst is also good, however, the relative molecular mass distribution of the prepared PP is narrow, which is not conducive to the development of PP of different grades; when the succinate compound is used as an internal electron donor, the advantage is that the relative molecular mass distribution of the prepared PP is wide and the disadvantage is that the stereoregularity of PP and the hydrogen sensitivity of the catalyst need to be improved; the activity of the diol ester catalytic system is not as good as that of the diether system.

It is an object of the industry to develop a novel electron donor with low production cost and a high-efficiency Ziegler-Natta catalyst containing it with excellent activity that can be used to obtain polymers with good stereospecificity, adjustable molecular weight distribution and good polymer comprehensive performance.

SUMMARY OF THE INVENTION

An object of the present invention is to provide a solid catalyst component for $CH_2=CHR$ olefin polymerization.

Another object of the present invention is to provide a method for preparing the solid catalyst component.

A further object of the present invention is to provide use of the solid catalyst component in preparation of catalyst for $CH_2=CHR$ olefin polymerization.

To attain the object of the present invention, provided is a solid catalyst component for $CH_2=CHR$ olefin polymerization ($CH_2=CHR$ olefin, where R is hydrogen or hydrocarbon group having 1 to 12 carbon atoms), which comprises Mg, Ti, a halogen and at least one electron donor, the electron donor is selected from 2-substituted amino-phenyl ester compounds represented by general formula (I):

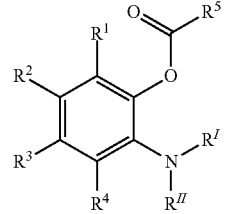

general formula (I)

wherein $R^1$, $R^2$, $R^3$ and $R^4$ are the same or different and are selected from H, halogen, a $C_1$-$C_{20}$ hydrocarbon group which may contain one or more heteroatoms selected from N, O, S, P, Si and halogen as a substituent of a carbon atom or a hydrogen atom or both; wherein two or more of $R^1$, $R^2$, $R^3$ and $R^4$ may be bonded to each other to form a ring; $R^5$ is a $C_1$-$C_{20}$ hydrocarbon group which may contain one or more heteroatoms selected from N, O, S, P, Si and halogen as a substituent of a carbon atom or a hydrogen atom or both; wherein $R^I$ and $R^{II}$ are the same or different and are H, a $C_1$-$C_{20}$ hydrocarbon group which may contain one or more heteroatoms selected from N, O, S, P, Si and halogen and may contain an unsaturated bond; and $R^I$ and $R^{II}$ may be bonded to form a ring or an unsaturated bond.

Preferably, $R^1$, $R^2$, $R^3$ and $R^4$ are the same or different and are selected from H, halogen, $C_1$-$C_{20}$ linear or branched alkyl, cycloalkyl, alkenyl, ester group, phenyl, alkylphenyl, phenylalkyl, indenyl, benzyl, halo or alkyl, cycloalkyl, phenyl, alkylphenyl, phenylalkyl, indenyl or benzyl group substituted with N, O, S, P, Si heteroatoms, or a heterocyclic aryl substituent; wherein two or more of $R^1$, $R^2$, $R^3$ and $R^4$ may be bonded to each other to form a saturated or unsaturated cyclic structure; wherein $R^5$ is $C_1$-$C_{20}$ linear or branched alkyl, cycloalkyl, alkenyl, ester group, phenyl, alkylphenyl, phenylalkyl, indenyl, benzyl, halo or alkyl, cycloalkyl, phenyl, alkylphenyl, phenylalkyl, indenyl, benzyl substituted with N, O, S, P, Si heteroatoms, or a heterocyclic aryl substituent; wherein $R^I$ and $R^{II}$ are the same or different are selected from H, $C_1$-$C_{20}$ linear or branched alkyl, cycloalkyl, alkenyl, ester group, phenyl, alkylphenyl, phenylalkyl, indenyl, benzyl, halo or alkyl, cycloalkyl, phenyl, alkylphenyl, phenylalkyl, indenyl or benzyl group substituted with N, O, S, P, Si heteroatoms; or a heterocyclic aryl substituent; and $R^I$ and $R^{II}$ may be bonded to form a ring or by an unsaturated bond.

In one embodiment, at least one (or two, or three, or four) R groups of $R^1$-$R^4$ are selected from a substituted hydrocarbyl group containing 1 to 20 carbon atoms, an unsubstituted hydrocarbyl group containing 1 to 20 carbon atoms, an alkoxy group containing 1 to 20 carbon atoms, a hetero atom, and combinations thereof.

In one embodiment, any adjacent R groups in $R^1$-$R^4$ may be bonded to form an inter-ring or in-ring structure. The inter-ring/in-ring structure may or may not be aromatic. In one embodiment, the inter-ring/in-ring structure is a $C_5$-membered ring or a $C_6$-membered ring.

Among the compounds in the above general formula (I), compounds represented by the following general formula (II) are preferred:

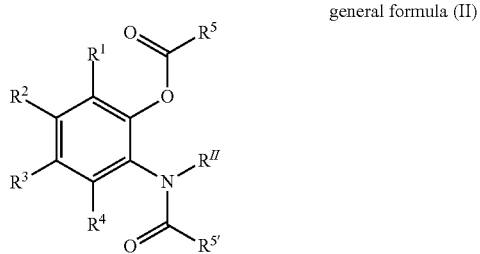

general formula (II)

wherein the groups $R^1$-$R^4$ and $R^{II}$ have the same meanings as the general formula (I); $R^{5'}$ and $R^5$ are the same or different and are a $C_1$-$C_{20}$ hydrocarbon group which may contain one or more heteroatoms selected from N, O, S, P, Si and halogen as a substituent of a carbon atom or a hydrogen atom or both, preferably are a $C_1$-$C_{20}$ linear or branched alkyl, cycloalkyl, alkenyl, ester group, phenyl, alkylphenyl, phenylalkyl, indenyl, benzyl, halo or alkyl, cycloalkyl, phenyl, alkylphenyl, phenylalkyl, indenyl or benzyl substituted with N, O, S, P, Si heteroatoms; or a heterocyclic aryl substituent.

Specific examples of compounds included in the general formula (II) are given below:

2-acetamide-phenyl acetate; 2-propionamide-phenyl propionate; 2-n-butyramide-phenyl n-butyrate; 2-isobutyramide-phenyl isobutyrate; 2-n-pentanamide-phenyl n-pentanoate; 2-isopentanamide-phenyl isopentanoate; 2-n-hexanoamide-phenyl n-hexanoate; 2-cyclohexanecarboxamide-phenyl cyclohexanecarboxylate; 2-n-heptanamide-phenyl n-heptanoate; 2-n-octanamide-p-phenyl octanoate; 2-n-nonanamide-phenyl n-nonanoate; 2-n-decanoyl-phenyl n-decanoate; 2-n-undecanamide-phenyl n-undecanoate; 2-n-dodecanamide-phenyl dodecanoate; 2-n-tridecanamide-phenyl n-tridecanoate; 2-n-tetradecanamide-phenyl n-tetradecanoate; 2-n-pentadecanamide-phenyl n-pentadecanoate; 2-n-hexadecanamide-phenyl n-hexadecanoate; 2-n-heptadecanamide-phenyl n-heptadecanoate; 2-n-octadecanamide-phenyl n-octadecanoate; 2-n-nonadecanamide-phenyl n-nonadecanoate; 2-n-eicosanamide-phenyl n-eicosanoate;

2-acetamide-4-methyl-phenyl acetate; 2-propionamide-4-methyl-phenyl propionate; 2-n-butyramide-4-methyl-phenyl n-butyrate; 2-isobutyramide-4-methyl-phenyl isobutyrate; 2-n-pentanamide-4-methyl-phenyl n-pentanoate; 2-isopentanamide-4-methyl-phenyl isopentanoate; 2-n-hexanoamide-4-methyl-phenyl n-hexanoate; 2-cyclohexanecarboxamide-4-methyl-phenyl cyclohexanecarboxylate; 2-n-heptanamide-4-methyl-phenyl n-heptanoate; 2-n-octanamide-p-4-methyl-phenyl octanoate; 2-n-nonanamide-4-methyl-phenyl n-nonanoate; 2-n-decanoyl-4-methyl-phenyl n-decanoate; 2-n-undecanamide-4-methyl-phenyl n-undecanoate; 2-n-dodecanamide-4-methyl-phenyl dodecanoate; 2-n-tridecanamide-4-methyl-phenyl n-tridecanoate; 2-n-tetradecanamide-4-methyl-phenyl n-tetradecanoate; 2-n-pentadecanamide-4-methyl-phenyl n-pentadecanoate; 2-n-hexadecanamide-4-methyl-phenyl n-hexadecanoate; 2-n-heptadecanamide-4-methyl-phenyl n-heptadecanoate; 2-n-octadecanamide-4-methyl-phenyl n-octadecanoate; 2-n-nonadecanamide-4-methyl-phenyl n-nonadecanoate; 2-n-eicosanamide-4-methyl-phenyl n-eicosanoate;

2-acetamide-4-ethyl-phenyl acetate; 2-propionamide-4-ethyl-phenyl propionate; 2-n-butyramide-4-ethyl-phenyl n-butyrate; 2-isobutyramide-4-ethyl-phenyl isobutyrate; 2-n-pentanamide-4-ethyl-phenyl n-pentanoate; 2-isopentanamide-4-ethyl-phenyl isopentanoate; 2-n-hexanoamide-4-ethyl-phenyl n-hexanoate; 2-cyclohexanecarboxamide-4-ethyl-phenyl cyclohexanecarboxylate; 2-n-heptanamide-4-ethyl-phenyl n-heptanoate; 2-n-octanamide-p-4-ethyl-phenyl octanoate; 2-n-nonanamide-4-ethyl-phenyl n-nonanoate; 2-n-decanoyl-4-ethyl-phenyl n-decanoate;

2-acetamide-4-tert-butyl-phenyl acetate; 2-propionamide-4-tert-butyl-phenyl propionate; 2-n-butyramide-4-tert-butyl-phenyl n-butyrate; 2-isobutyramide-4-tert-butyl-phenyl isobutyrate; 2-n-pentanamide-4-tert-butyl-phenyl n-pentanoate; 2-isopentanamide-4-tert-butyl-phenyl isopentanoate; 2-n-hexanoamide-4-tert-butyl-phenyl n-hexanoate; 2-cyclohexanecarboxamide-4-tert-butyl-phenyl cyclohexanecarboxylate; 2-n-heptanamide-4-tert-butyl-phenyl n-heptanoate; 2-n-octanamide-p-4-tert-butyl-phenyl octanoate; 2-n-nonanamide-4-tert-butyl-phenyl n-nonanoate; 2-n-decanoyl-4-tert-butyl-phenyl n-decanoate; 2-n-undecanamide-4-tert-butyl-phenyl n-undecanoate; 2-n-dodecanamide-4-tert-butyl-phenyl dodecanoate; 2-n-tridecanamide-4-tert-butyl-phenyl n-tridecanoate; 2-n-tetradecanamide-4-tert-butyl-phenyl n-tetradecanoate; 2-n-pentadecanamide-4-tert-butyl-phenyl n-pentadecanoate; 2-n-hexadecanamide-4-tert-butyl-phenyl n-hexadecanoate; 2-n-heptadecanamide-4-tert-butyl-phenyl n-heptadecanoate; 2-n-octadecanamide-4-tert-butyl-phenyl n-octadecanoate; 2-n-nonadecanamide-4-tert-butyl-phenyl n-nonadecanoate; 2-n-eicosanamide-4-tert-butyl-phenyl n-eicosanoate;

2-acetamide-4-methyl-6-methyl-phenyl acetate; 2-propionamide-4-methyl-6-methyl-phenyl propionate; 2-n-butyramide-4-methyl-6-methyl-phenyl n-butyrate; 2-isobutyramide-4-methyl-6-methyl-phenyl isobutyrate; 2-n-pentanamide-4-methyl-6-methyl-phenyl n-pentanoate; 2-isopentanamide-4-methyl-6-methyl-phenyl isopentanoate; 2-n-hexanoamide-4-methyl-6-methyl-phenyl n-hexanoate; 2-cyclohexanecarboxamide-4-methyl-6-methyl-phenyl cyclohexanecarboxylate; 2-n-heptanamide-4-methyl-6-methyl-phenyl n-heptanoate; 2-n-octanamide-p-4-methyl-6-methyl-phenyl octanoate; 2-n-nonanamide-4-methyl-6-methyl-phenyl n-nonanoate; 2-n-decanoyl-4-methyl-6-methyl-phenyl n-decanoate;

2-acetamide-4-chloro-phenyl acetate; 2-propionamide-4-chloro-phenyl propionate; 2-n-butyramide-4-chloro-phenyl n-butyrate; 2-isobutyramide-4-chloro-phenyl isobutyrate; 2-n-pentanamide-4-chloro-phenyl n-pentanoate; 2-isopentanamide-4-chloro-phenyl isopentanoate; 2-n-hexanoamide-4-chloro-phenyl n-hexanoate; 2-cyclohexanecarboxamide-4-chloro-phenyl cyclohexanecarboxylate; 1-n-butyramide-naphthyl 2-n-butyrate;

2-benzamide-phenyl benzoate; 2-p-chlorobenzamide-phenyl p-chlorobenzoate; 2-m-bromobenzamide-phenyl m-bromobenzoate; 2-o-chlorobenzamide-phenyl o-chlorobenzoate; 2-p-methoxybenzamide-phenyl p-methoxybenzoate; 2-p-methylbenzamide-phenyl p-methylbenzoate; 2-phenoxycarboxamide-phenyl phenoxybenzoate; 2-(1-naphthalenecarboxamide)-(1-naphthoic acid)phenyl ester; 2-pentafluorobenzamide-phenyl pentafluorobenzoate; 2-p- trifluoromethylbenzamide-phenyl p-trifluoromethylbenzoate; 1-benzamide-naphthyl 2-benzoate;

2-[N-benzamide-N-tert-butyl]-phenyl benzoate; 2-[N-benzamide-N-tert-butyl]-4-tert-butyl-phenyl benzoate; 2-[N-benzamide-N-tert-butyl]-4-methyl-phenyl benzoate; 2-[N-benzamide-N-tert-butyl]-4-ethyl-phenyl benzoate; 2-[N-benzamide-N-tert-butyl]-4-methyl-6-methyl-phenyl benzoate; 2-[N-benzamide-N-tert-butyl]-4-tert-butyl-phenyl isovalerate; 2-[N-benzamide-N-phenyl]-4-tert-butyl-phenyl benzoate; 2-[N-benzamide-N-phenyl]-4-methyl-phenyl benzoate; 2-[N-benzamide-N-phenyl]-4-ethyl-phenyl benzoate; 2-[N-benzamide-N-phenyl]-4-methyl-6-methyl-phenyl benzoate; 2-[N-benzamide-N-phenyl]-4-tert-butyl-phenyl n-butyrate; 2-[N-benzamide-N-methyl]-4-tert-butyl-phenyl n-butyrate;

2-benzamide-4-methyl-phenyl benzoate; 2-p-chlorobenzamide-4-methyl-phenyl p-chlorobenzoate; 2-m-bromobenzamide-4-methyl-phenyl m-bromobenzoate; 2-o-chlorobenzamide-4-methyl-phenyl o-chlorobenzoate; 2-p-methoxybenzamide-4-methyl-phenyl p-methoxybenzoate; 2-p-methylbenzamide-4-methyl-phenyl p-methylbenzoate; 2-phenoxycarboxamide-4-methyl-phenyl phenoxycarboxylate; 2-(1-naphthalenecarboxamide)-4-methyl-(1-naphthoic acid)phenyl ester; 2-pentafluorobenzamide-4-methyl-phenyl pentafluorobenzoate; 2-p-trifluoromethylbenzamide-4-methyl-phenyl p-trifluoromethylbenzoate;

2-benzamide-4-ethyl-phenyl benzoate; 2-p-chlorobenzamide-4-ethyl-phenyl p-chlorobenzoate; 2-m-bromobenzamide-4-ethyl-phenyl m-bromobenzoate; 2-o-chlorobenzamide-4-ethyl-phenyl o-chlorobenzoate; 2-p-methoxybenzamide-4-ethyl-phenyl p-methoxybenzoate; 2-p-methylbenzamide-4-ethyl-phenyl p-methylbenzoate; 2-phenoxycarboxamide-4-ethyl-phenyl phenoxycarboxylate; 2-(1-naphthalenecarboxamide)-4-ethyl-(1-naphthoic acid)phenyl ester; 2-pentafluorobenzamide-4-ethyl-phenyl pentafluorobenzoate; 2-p-trifluoromethylbenzamide-4-ethyl-phenyl p-trifluoromethylbenzoate;

2-benzamide-4-tert-butyl-phenyl benzoate; 2-p-chlorobenzamide-4-tert-butyl-phenyl p-chlorobenzoate; 2-m-bromobenzamide-4-tert-butyl-phenyl m-bromobenzoate; 2-o-chlorobenzamide-4-tert-butyl-phenyl o-chlorobenzoate; 2-p-methoxybenzamide-4-tert-butyl-phenyl p-methoxybenzoate; 2-p-methylbenzamide-4-tert-butyl-phenyl p-methylbenzoate; 2-phenoxycarboxamide-4-tert-butyl-phenyl phenoxycarboxylate; 2-(1-naphthylcarboxamide)-4-tert-butyl-(1-naphthoic acid)phenyl ester; 2-pentafluorobenzamide-4-tert-butyl-phenyl pentafluorobenzoate; 2-p-trifluoromethylbenzamide-4-tert-butyl-phenyl p-trifluoromethylbenzoate;

2-benzamide-4-methyl-6-methyl-phenyl benzoate; 2-p-chlorobenzamide-4-methyl-6-methyl-phenyl p-chlorobenzoate; 2-m-bromobenzamide-4-methyl-6-methyl-phenyl m-bromobenzoate; 2-o-chlorobenzamide-4-methyl-6-methyl-phenyl o-chlorobenzoate; 2-p-methoxybenzamide-4-methyl-6-methyl-phenyl p-methoxybenzoate; 2-p-methylbenzamide-4-methyl-6-methyl-phenyl p-methylbenzoate; 2-phenyloxycarboxamide-4-methyl-6-methyl-phenyl phenoxycarboxylate; 2-(1-naphthalenecarboxamide)-4-methyl-6-methyl-(1-naphthoic acid) phenyl ester; 2-pentafluorobenzamide-4-methyl-6-methyl-phenyl pentafluorobenzoate; 2-p-trifluoromethylbenzamide-4-methyl-6-methyl-phenyl p-trifluoromethylbenzoate;

2-benzamide-4-chloro-phenyl benzoate; 2-p-chlorobenzamide-4-chloro-phenyl p-chlorobenzoate; 2-m-bromobenzamide-4-chloro-phenyl m-bromobenzoate; 2-o-chlorobenzamide-4-chloro-phenyl o-chlorobenzoate; 2-p-methoxybenzamide-4-chloro-phenyl p-methoxybenzoate; 2-p-methylbenzamide-4-chloro-phenyl p-methylbenzoate; 2-phenoxycarboxamide-4-chloro-phenyl phenoxycarboxylate; 2-(1-naphthalenecarboxamide)-4-chloro-(1-naphthoic acid) phenyl ester; 2-pentafluorobenzamide-4-chloro-phenyl pentafluorobenzoate; 2-trifluoromethylbenzamide-4-chloro-phenyl p-trifluoromethylbenzoate.

2-phenoxycarboxamide-phenyl phenoxycarboxylate; 2-phenoxycarboxamide-4-methyl-phenyl phenoxycarboxylate; 2-phenoxycarboxamide-4-ethyl-phenyl phenoxycarboxylate; 2-phenyloxycarboxamide-4-tert-butyl-phenyl phenoxycarboxylate; 2-phenoxycarboxamide-4-methyl-6-methyl-phenyl phenoxycarboxylate; 2-p-methoxyphenoxycarboxamide-phenyl p-methoxyphenoxycarboxylate; 2-m-chlorophenoxycarboxamide-phenyl m-chlorophenoxybenzoate; 2-p-chlorophenoxycarboxamide-phenyl p-chlorophenoxybenzoate; 2-o-chlorophenyloxycarboxamide-phenyl o-chlorophenoxycarboxylate; 2-n-butyloxycarboxamide-phenyl butoxybenzoate; 2-n-butyloxy carboxamide-4-methyl-phenyl butoxycarboxylate; 2-n-butyloxycarboxamide-4-ethyl-phenyl butoxycarboxylate; 2-n-butyloxycarboxamide-4-tert-butyl-phenyl butoxycarboxylate; 2-n-butyloxycarboxamide-4-methyl-6-methyl-phenyl butoxycarboxylate; 2-n-butyloxycarboxamide-4-chloro-phenyl butoxycarboxylate; 2-isobutyloxycarboxamide-phenyl isobutoxycarboxylate; 2-iso pentyloxycarboxamide-phenyl isopentoxycarboxylate; 2-n-octyloxycarboxamide-phenyl n-octanoate; 2-ethoxycarboxamide-phenyl ethoxycarboxylate; 2-ethoxycarboxamide-4-methyl-phenyl ethoxycarboxylate; 2-ethoxycarboxamide-4-ethyl-phenyl ethoxycarboxylate; 2-ethoxycarboxamide-4-tert-butyl-phenyl ethoxycarboxylate; 2-ethoxycarboxamide-4-methyl-6-methyl-phenyl ethoxycarboxylate; 2-ethoxycarboxamide 4-chloro-phenyl ethoxycarboxylate;

Among the compounds represented by the general formula (II), compounds represented by the following general formula (III) are preferred:

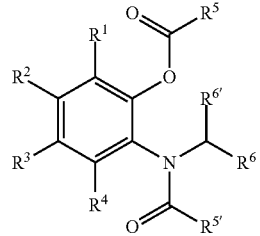

general formula (III)

wherein the group $R^1$-$R^5$ has the same meaning as in the general formula (I), $R^{5'}$ has the same meaning as the general formula (II), and $R^6$ and $R^{6'}$ are the same or different and can be selected from H; a $C_1$-$C_{20}$ hydrocarbon group which may contain one or more heteroatoms selected from N, O, S, P, Si and halogen as a substituent of a carbon atom or a hydrogen atom or both, preferably are a $C_1$-$C_{20}$ linear or branched alkyl, cycloalkyl, alkenyl, ester group, phenyl, alkylphenyl, phenylalkyl, indenyl, benzyl, halo or alkyl, cycloalkyl, phenyl, alkylphenyl, phenylalkyl, indenyl or benzyl substituted with N, O, S, P, Si heteroatoms; or a heterocyclic aryl substituent.

Specific examples of compounds included in the general formula (III) are:

2-[N-benzoyl-N-benzyl]-phenyl benzoate; 2-[N-p-chlorobenzoyl-N-benzyl]-phenyl p-chlorobenzoate; 2-[N-m- bromobenzoyl-N-benzyl]-pheny m-bromobenzoate; 2-[N-o-chlorobenzoyl-N-benzyl]-phenyl o-chlorobenzoate; 2-[N-p-methoxybenzoyl-N-benzyl]-phenyl p-methoxybenzoate; 2-[N-p-methylbenzoyl-N-benzyl]-phenyl p-methylbenzoate; 2-[N-phenoxycarbonyl-N-benzyl]-phenyl phenoxycarboxylate; 2-(1-naphthoyl-N-benzyl)-(1-naphthoic acid)phenyl ester; 2-[N-pentafluorobenzoyl-N-benzyl]-phenyl pentafluorobenzoate; 2-[N-p-trifluoromethylbenzoyl-N-benzyl]-phenyl p-trifluoromethylbenzoate; 1-[N-benzoyl-N-benzyl]-2-naphthyl benzoate;

2-[N-benzoyl-N-benzyl]-tert-butyl-phenyl benzoate; 2-[N-p-chlorobenzoyl-N-benzyl]-tert-butyl-phenyl p-chlorobenzoate; 2-[N-m-bromobenzoyl-N-benzyl]-pheny m-bromobenzoate; 2-[N-o-chlorobenzoyl-N-benzyl]-tert-butyl-phenyl o-chlorobenzoate; 2-[N-p-methoxybenzoyl-N-benzyl]-tert-butyl-phenyl p-methoxybenzoate; 2-[N-p-methylbenzoyl-N-benzyl]-tert-butyl-phenyl p-methylbenzoate; 2-[N-phenoxycarbonyl-N-benzyl]-tert-butyl-phenyl phenoxycarboxylate; 2-(1-naphthoyl-N-benzyl)-(1-naphthoic acid)tert-butyl-phenyl ester; 2-[N-pentafluorobenzoyl-N-benzyl]-tert-butyl-phenyl pentafluorobenzoate; 2-[N-p-trifluoromethylbenzoyl-N-benzyl]-tert-butyl-phenyl p-trifluoromethylbenzoate;

2-[N-benzoyl-N-benzyl]-4-methyl-phenyl benzoate; 2-[N-p-chlorobenzoyl-N-benzyl]-4-methyl-phenyl p-chlorobenzoate; 2-[N-m-bromobenzoyl-N-benzyl]-pheny m-bromobenzoate; 2-[N-o-chlorobenzoyl-N-benzyl]-4-methyl-phenyl o-chlorobenzoate; 2-[N-p-methoxybenzoyl-N-benzyl]-4-methyl-phenyl p-methoxybenzoate; 2-[N-p-methylbenzoyl-N-benzyl]-4-methyl-phenyl p-methylbenzoate; 2-[N-phenoxycarbonyl-N-benzyl]-4-methyl-phenyl phenoxycarboxylate; 2-(1-naphthoyl-N-benzyl)-(1-naphthoic acid)4-methyl-phenyl ester; 2-[N-pentafluorobenzoyl-N-benzyl]-4-methyl-phenyl pentafluorobenzoate; 2-[N-p-trifluoromethylbenzoyl-N-benzyl]-4-methyl-phenyl p-trifluoromethylbenzoate; 1-[N-benzoyl-N-benzyl]-2-naphthyl benzoate;

2-[N-benzoyl-N-phenylethyl]-4-tert-butyl-phenyl benzoate; 2-[N-p-chlorobenzoyl-N-n-pentyl]-4-t-butyl-phenyl p-chlorobenzoate; 2-[N-p-chlorobenzoyl-N-isopropyl]-4-tert-butyl-phenyl p-chlorobenzoate; 2-[N-m-bromobenzoyl-N-isobutyl]-4-tert-butyl-phenyl m-bromobenzoate; 2-[N-o-chlorobenzoyl-N-cyclohexylmethyl]-4-tert-butyl-phenyl o-chlorobenzoate; 2-[N-p-methoxybenzoyl-N-p-chlorobenzyl]-4-tert-butyl-phenyl p-methoxybenzoate; 2-[N-p-methylbenzoyl-N-p-methoxybenzyl]-4-tert-butyl-phenyl p-methylbenzoate; 2-[N-phenoxycarbonyl-N-diphenylmethyl]-4-tert-butyl-phenyl phenoxycarboxylate; 2-(1-naphthoyl-N-decyl)-4-tert-butyl-(1-naphthoic acid)phenyl ester; 2-[N-pentafluorobenzoyl-N-n-hexyl]-4-tert-butyl-phenyl pentafluorobenzoate; 2-[N-p-trifluoromethylbenzoyl-N-n-heptyl]-4-tert-butyl-phenyl p-trifluoromethyl benzoate 2-[N-benzoyl-N-phenylethyl]-4-methyl-6-methyl-phenyl benzoate; 2-[N-p-chlorobenzoyl-N-n-pentyl]-4-methyl-6-methyl-phenyl p-chlorobenzoate; 2-[N-p-chlorobenzoyl-N-n-propyl]-4-methyl-6-methyl-phenyl p-chlorobenzoate; 2-[N-m-bromobenzoyl-N-isobutyl]-4-methyl-6-methyl-phenyl m-bromobenzoate;

2-[N-benzoyl-N-diphenylmethyl]-4-methyl-6-methyl-phenyl benzoate; 2-[N-p-chlorobenzoyl-N-diphenylmethyl]-4-methyl-6-methyl-phenyl p-chlorobenzoate; 2-[N-p-chlorobenzoyl-N-diphenylmethyl]-4-methyl-6-methyl-phenyl p-chlorobenzoate; 2-[N-m-bromobenzoyl-N-diphenylmethyl]-4-methyl-6-methyl-phenyl m-bromobenzoate;

2-[N-acetyl-N-benzyl]-phenyl acetate; 2-[N-propionyl-N-benzyl]-phenyl propionoate; 2-[N-n-butyryl-N-benzyl]-phenyl n-butyrate; 2-[N-isobutyryl-N-benzyl]-phenyl isobutyrate; 2-[N-n-pentanoyl-N-benzyl]-phenyl n-pentanoate; 2-[N-isopentanoyl-N-benzyl]-phenyl pentanoate; 2-[N-n-hexanoyl-N-benzyl]-phenyl n-hexanoate; 2-[N-cyclohexanecarbonyl-N-benzyl]-phenyl cyclohexanecarboxylate; 2-[N-n-heptanoyl-N-benzyl]-phenyl n-heptanoate; 2-[N-n-octanoyl-N-benzyl]-phenyl n-octanoate; 2-[N-n-nonanoyl-N-benzyl]-phenyl n-nonanoate; 2-[N-n-decanoyl-N-benzyl]-phenyl n-decanoate; 2-[N-n-undecanoyl-N-benzyl]-phenyl n-undecanoate; 2-[N-n-dodecanoyl-N-benzyl]-phenyl n-dodecanoate; 2-[N-n-tridecanoyl-benzyl]-phenyl n-tridecanoate; 2-[N-n-tetradecanoyl-N-benzyl]-phenyl n-tetradecanoate; 2-[N-n-pentadecanoyl-N-benzyl]-phenyl n-pentadecanoate; 2-[N-n-hexadecanoyl-N-benzyl]-phenyl n-hexadecanoate; 2-[N-n-heptadecanoyl-N-benzyl]-phenyl n-heptadecanoate; 2-[N-n-octadecanoyl-N-benzyl]-phenyl n-octadecanoate; 2-[N-n-nonadecanoyl-N-benzyl]-phenyl n-nonadecanoate; 2-[N-n-eicosanoyl-N-benzyl]-phenyl n-eicosanoate;

2-[N-acetyl-N-benzyl]-4-tert-butyl-phenyl acetate; 2-[N-propionyl-N-benzyl]-4-methyl-phenyl propionate; 2-[N-n-butyryl-N-benzyl]-4-methyl-phenyl n-butyrate; 2-[N-isobutyryl-N-benzyl]-4-tert-butyl-phenyl isobutyrate; 2-[N-n-pentanoyl-N-benzyl]-4-methyl-phenyl n-pentanoate; 2-[N-isopentanoyl-N-benzyl]-4-methyl-phenyl isopentanoate; 2-[N-n-hexanoyl-N-benzyl]-4-methyl-6-methyl-phenyl n-hexanoate; 2-[N-cyclohexanecarbonyl-N-benzyl]-4-tert-butyl-phenyl-cyclohexylcarboxylate; 2-[N-n-heptanoyl-N-benzyl]-4-tert-butyl-phenyl n-heptanoate; 2-[N-n-octanoyl-N-benzyl]-4-methyl-phenyl n-octanoate; 2-[N-n-nonanoyl-N-benzyl]-4-methyl-phenyl n-nonanoate; 2-[N-n-decanoyl-N-benzyl]-4-tert-butyl-phenyl n-decanoate; 2-[N-n-undecyl-N-benzyl]-4-tert-butyl-phenyl n-undecanoate; 2-[N-dodecanoyl-N-benzyl]-tert-butyl-phenyl n-dodecanoate; 2-[N-n-tridecanoyl-N-benzyl]-4-tert-butyl-phenyl n-tridecanoate; 2-[N-n-tetradecanoyl-N-benzyl]-4-tert-butyl-phenyl n-tetradecanoate;

2-[N-acetyl-N-phenethyl]-4-tert-butyl-phenyl acetate; 2-[N-propionyl-N-phenylethyl]-4-methyl-phenyl propionoate; 2-[N-n-butyryl-N-n-pentyl]-4-phenyl-phenyl n-butyrate; 2-[N-isobutyryl-N-isobutyl]-4-tert-butyl-phenyl isobutyrate; 2-[N-n-pentanoyl-N-n-hexyl]-4-methyl-phenyl n-pentanoate; 2-[N-isovaleryl-N-cyclohexylmethyl]-4-methyl-phenyl isovalerate; 2-[N-n-hexanoyl-N-n-decyl]-4-methyl-6-methyl-phenyl n-hexanoate; 2-[N-cyclohexanecarbonyl-N-p-methoxybenzyl]-4-tert-butyl-phenyl cyclohexanecarboxylate; 2-[N-n-heptanoyl-N-o-chlorobenzyl]-4-tert-butyl-phenyl n-heptanoate; 2-[N-n-octanoyl-N-p-methylbenzyl]-4-methyl-phenyl n-octanoate; 2-[N-n-nonanoyl-N-n-propyl]-4-methyl-phenyl decanoate; 2-[N-n-decanoyl-N-isopentyl]-4-tert-butyl-phenyl n-decanoate; 2-[N-n-undecyl-N-isopentyl]-4-tert-butyl-phenyl n-undecanoate; 2-[N-n-dodecanoyl-N-cyclopentylmethyl]-4-tert-butyl-phenyl n-dodecanoate; 2-[N-n-tridecanoyl-N-p-trifluoromethylbenzyl]-4-tert-butyl-phenyl n-tridecanoate; 2-[N-n-tetradecanoyl-N-m-chlorobenzyl]-4-tert-butyl-phenyl tetradecanoate;

2-[N-phenoxycarbonyl-N-benzyl]-phenyl phenoxycarboxylate; 2-[N-p-methylphenoxycarbonyl-N-benzyl]-phenyl p-methylphenoxycarboxylate; 2-[N-p-methoxyphenoxycarbonyl-N-benzyl]-phenyl p-methoxyphenoxycarboxylate; 2-[N-phenoxycarbonyl-N-benzyl]-4-tert-butylphenyl phenoxycarboxylate; 2-[N-phenoxycarbonyl-N-benzyl]-4-methyl-phenyl phenoxycarboxylate; 2-[N-phenoxycarbonyl-N-benzyl]-4-ethyl-phenyl phenoxycarboxylate; 2-[N-phenoxycarbonyl-N-benzyl]-4-methyl-6-methyl-phenyl phenoxycarboxylate; 2-[N-n-butyloxycarbonyl-N-diphenylmethyl]-phenyl n-butyloxycarboxylate; 2-[N-isopentyloxycarbonyl-N-diphenylmethyl]-phenyl isopentyloxycarboxylate; 2-[N-n-butyloxy carbonyl-N-diphenylmethyl]-4-methyl-6-methyl-phenyl n-butyloxycarboxylate; 2-[N-n-butyloxycarbonyl-N-di phenylmethyl]-4-methyl-n-butyloxycarboxylate; 2-[N-n-butyloxycarbonyl-N-diphenylmethyl]-4-tert-butyl-phenyl n-butyloxycarboxylate; 2-ethoxyformamide-phenyl ethyloxycarboxylate; 2-ethoxyformamide-4-methyl-phenyl ethyloxycarboxylate; 2-ethoxyformamide-4-ethyl-phenyl ethyloxycarboxylate; 2-ethoxyformamide-4-tert-butyl-phenyl ethyloxycarboxylate; 2-ethoxyformamide-4-methyl-6-methyl-phenyl ethyloxycarboxylate; 2-ethoxyformamide-4-chloro-phenyl ethyloxycarboxylate;

Among the compounds of the general formula (I), compounds of the general formula (IV) of the formula are also preferred:

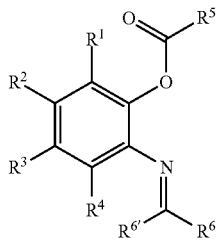

general formula (IV)

wherein the groups $R^1$ to $R^5$ have the same meanings as the general formula (I); and $R^6$ and $R^{6'}$ have the same meanings as the general formula (III).

Specific examples of compounds included in the general formula (IV) are:

2-benzylimine-phenyl benzoate; 2-phenylethylenimine-phenyl benzoate; 2-n-propylimine-phenyl benzoate; 2-n-pentylimine-phenyl benzoate; 2-isopentyl imine-phenyl benzoate; 2-n-butylimine-phenyl benzoate; 2-n-heptylimine-phenyl benzoate; 2-(2-furanmethyl)imine-phenyl benzoate; 2-n-hexylimine-phenyl benzoate; 2-n-decylimine-phenyl benzoate; 2-cyclohexylmethylimine-phenyl benzoate; 2-cyclopentylmethylimine-phenyl benzoate; 2-p-chlorobenzylimine-phenyl benzoate; 2-m-chlorobenzylimine-phenyl benzoate; 2-o-chlorobenzylimine-phenyl benzoate; 2-p-methoxybenzylimine-phenyl benzoate; 2-p-methylbenzylimine-phenyl benzoate; 1-benzylimine-2-naphthyl benzoate;

2-benzylimine-4-methyl-phenyl benzoate; 2-4-methylphenylethylenimine-4-methyl-phenyl benzoate; 2-n-propylimine-4-methyl-phenyl benzoate; 2-n-pentylimine-4-methyl-phenyl benzoate; 2-isopentyl imine-4-methyl-phenyl benzoate; 2-n-butylimine-4-methyl-phenyl benzoate; 2-n-heptylimine-4-methyl-phenyl benzoate; 2-(2-furanmethyl)imine-4-methyl-phenyl benzoate; 2-n-hexylimine-4-methyl-phenyl benzoate; 2-n-decylimine-4-methyl-phenyl benzoate; 2-cyclohexylmethylimine-4-methyl-phenyl benzoate; 2-cyclopentylmethylimine-4-methyl-phenyl benzoate; 2-p-chlorobenzylimine-4-methyl-phenyl benzoate; 2-m-chlorobenzylimine-4-methyl-phenyl benzoate; 2-o-chlorobenzylimine-4-methyl-phenyl benzoate; 2-p-methoxybenzylimine-4-methyl-phenyl benzoate; 2-p-methylbenzylimine-4-methyl-phenyl benzoate;

2-dibenzylimine-phenyl benzoate; 2-dibenzylimine-4-methyl-phenyl benzoate; 2-dibenzylimine-4-methyl-6-methyl-phenyl benzoate; 2-dibenzylimine-4-tert-butyl-phenyl benzoate; 2-dibenzylimine-phenyl isobutyrate; 2-dibenzylimine-4-methyl-6-methyl-phenyl isobutyrate; 2-dibenzylimine-4-methyl-phenyl m-chlorobenzoate; 2-dibenzylimine-4-methyl-6-methyl-phenyl phenoxycarboxylate;

2-benzylimine-4-tert-butyl-phenyl benzoate; 2-phenylethylimine-4-tert-butyl-phenyl benzoate; 2-n-pentylimine-4-tert-butyl-phenyl benzoate; 2-isopentylimine-4-tert-butyl-phenyl benzoate; 2-n-butylimine-4-tert-butyl-phenyl benzoate; 2-n-heptylimine-4-tert-butyl-phenyl benzoate; 2-(2-furanmethyl)imine-4-tert-butyl-phenyl benzoate; 2-n-hexyl imine-4-tert-butyl-phenyl benzoate; n-decylimine-4-tert-butyl-phenyl benzoate; 2-cyclohexylmethylimine-4-tert-butyl-phenyl benzoate; 2-cyclopentylmethylimine-4-tert-butyl-phenyl-benzoate; 2-p-chlorobenzylimine-4-tert-butyl-phenyl benzoate; 2-m-chlorobenzylimine-4-tert-butyl-phenyl benzoate; 2-o-chlorobenzylimine-4-tert-butyl-phenyl benzoate; 2-p-methoxybenzylimine-4-tert-butyl-phenyl benzoate; 2-p-methylbenzoimine-4-tert-butyl-phenyl benzoate; 2-p-methylbenzoimine-4-methyl-6-methyl-phenyl benzoate;

2-benzylimine-phenyl isobutyrate; 2-phenylethylimine-phenyl cyclohexylcarboxylate; 2-n-pentylimine-phenyl n-dodecanoate; 2-isopentylimine-phenyl o-chlorobenzoate; 2-n-butylimine-phenyl phenoxycarboxylate; 2-n-heptyl imine-phenyl pentafluorobenzoate; 2-n-hexylimine-phenyl p-trifluoromethylbenzoate; 2-n-decyl imine-phenyl p-methoxybenzoate; 2-cyclohexylmethylimine-phenyl cyclohexanecarboxylate; 2-cyclopentylmethylimine-phenyl n-heptanoate; 2-m-chloro benzylimine-phenyl hexadecanoate; 2-p-methoxybenzylimine-phenyl o-chlorobenzoate; 2-p-methylbenzylimine-phenyl n-pentanoate; 1-benzylimine-naphthyl 2-p-methoxybenzoate;

2-benzylimine-4-tert-butyl-phenyl isobutyrate; 2-phenylethylimine-4-tert-butyl-phenyl cyclohexanecarboxylate; 2-n-pentylimine-4-tert-butyl-phenyl n-dodecanoate; 2-isopentylimide-4-tert-butyl-phenyl o-chlorobenzoate; 2-n-butylimine-4-tert-butyl-phenyl phenoxycarboxylate; 2-n-heptylimine-4-tert-butyl-phenyl pentafluorobenzoate; 2-n-hexylimine-4-tert-butyl-phenyl p-trifluoromethylbenzoate; 2-n-decylimine-4-tert-butyl-phenyl p-methoxybenzoate; 2-cyclohexylmethylimine-4-t-butyl-phenyl cyclohexylcarboxylater; 2-cyclopentylmethylimine-4-tert-butyl-phenyl n-heptanoate; 2-m-chlorobenzylimine-4-tert-butyl-phenyl n-hexadecanate; 2-p-methoxybenzylimine-4-tert-butyl-phenyl o-chlorobenzoate; 2-p-methylbenzylimine-4-tert-butyl-phenyl n-pentanoate;

2-benzylimine-4-methyl-6-methyl-phenyl isobutyrate; 2-phenylethylimine-4-methyl-phenyl cyclohexanecarboxylate; 2-n-pentylimine-4-ethyl-phenyl n-dodecanoate; 2-isopentylimine-4-methyl-phenyl o-chlorobenzoate; 2-n-butylimine-4-methyl-6-methyl-phenyl phenoxycarboxylate; 2-n-heptylimine-4-methyl-phenyl pentafluorobenzoate; 2-n-hexylimine-4-methyl-phenyl p-trifluoromethylbenzoate.

2-n-hexylimine-phenyl phenoxycarboxylate; 2-n-hexylimine-4-methyl-phenyl phenoxycarboxylate; 2-n-hexylimine-4-ethyl-phenyl phenoxycarboxylate; 2-n-hexylimine-4-tert-butyl-phenyl phenoxycarboxylate; 2-n-hexylimine-4-methyl-6-methyl-phenyl phenoxycarboxylate; 2-n-hexylimine-4-chloro-phenyl phenoxycarboxylate; 2-isopentylimine-phenyl p-methylphenoxycarboxylate; 2-n-butylimine-phenyl m-chlorophenoxycarboxylate; 2-n-octylimine-phenyl p-methoxyphenoxycarboxylate; 2-n-butylimine-phenyl n-octyloxycarboxylate; 2-n-butylimine-4-methyl-phenyl n-octyloxycarboxylate; 2-n-butylimine-4-tert-butyl-phenyl n-octyloxycarboxylate; 2-n-butylimine-4-chloro-phenyl n-octyloxycarboxylate; 2-n-butylimine-4-methyl-6-methyl-phenyl n-octyloxycarboxylate; 2-n-butyl imine-phenyl n-butoxycarboxylate; 2-n-hexylimine-phenyl isopentyloxycarboxylate; 2-n-butylimine-phenyl ethyloxycarboxylate; 2-n-butylimine-4-methyl-phenyl ethyloxycarboxylate; 2-n-butylimine-4-tert-butyl-phenyl ethyloxycarboxylate; 2-n-butylimine-4-chloro-phenyl ethyloxycarboxylate; 2-n-butyl-imine-4-methyl-6-methyl-phenyl ethyloxycarboxylate; 2-n-butylimine-phenyl ethyloxycarboxylate; 2-n-hexylimine-phenyl ethyloxycarboxylate; 2-isopropyl imine-phenyl ethyloxycarboxylate.

The 2-substituted amino-phenyl esters of the present invention can be synthesized by various reactions, for illustrative purposes, but not intending to limit synthetic methods, for example, a compound of the general formula (II) in which $R^{II}$ is H can be obtained by reacting a substituted or unsubstituted o-aminophenol with an acid chloride or a chloroformate.

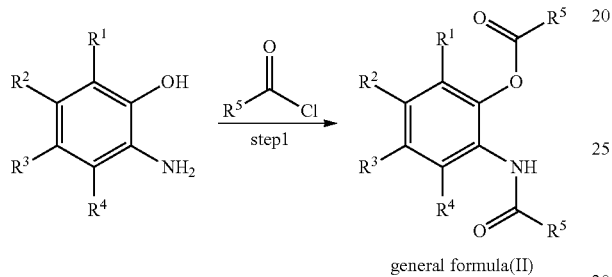

when the $R^{II}$ is not H, the compound of the general formula (II) can be obtained by the method of the following scheme, that is, the phenolic hydroxyl group of the substituted or unsubstituted o-aminophenol is first protected with a silane, followed by a reaction with the bromide or iodide of $R^{II}$ and a hydroxyl group deprotection reaction, and the target compounds are finally obtained by reaction with an acid chloride or a chloroformate. This method is particularly suitable for the preparation of compounds of the general formula (II) when $R^{II}$ is an aryl, a substituted aryl, a heterocyclic, a t-butyl or the like:

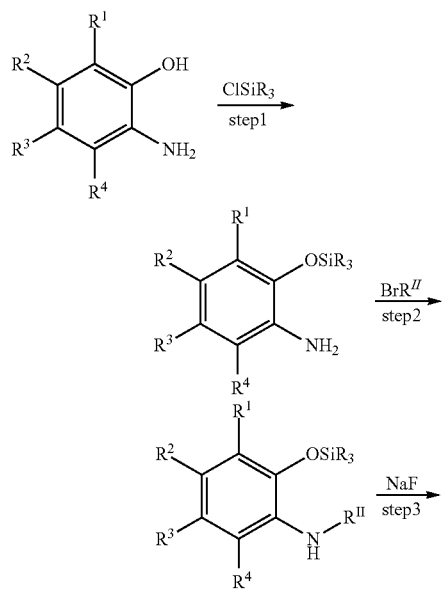

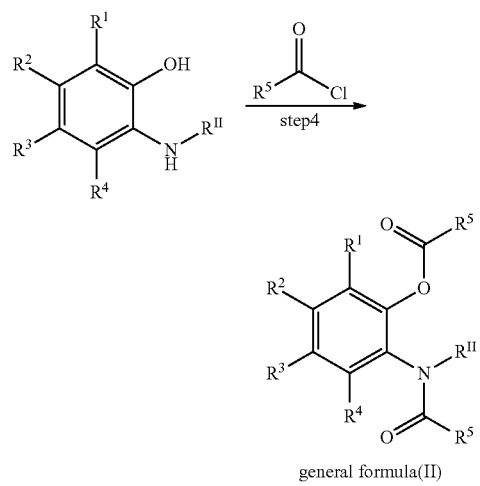

When the $R^5$ and R5' of the compound of the general formula (II) are different, they can also be prepared by the following method:

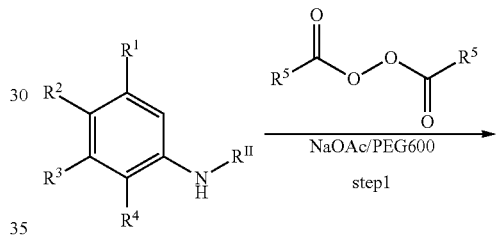

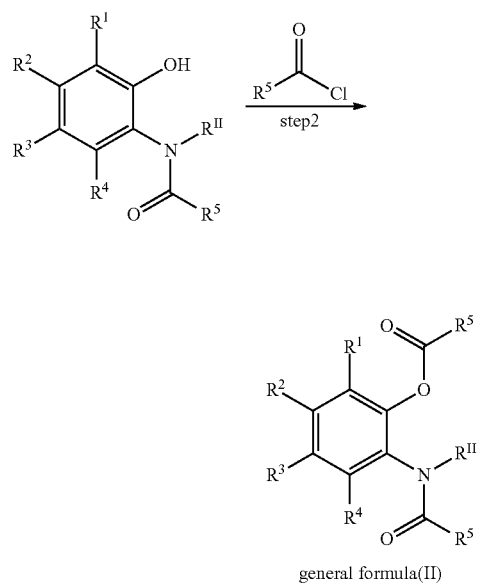

Compounds of general formula (III) as preferred compounds of the general formula (II) can be obtained by a reduction reaction of a substituted or unsubstituted o-aminophenol with an aldehyde or a ketone followed by a reaction with an acid chloride or a chloroformate.

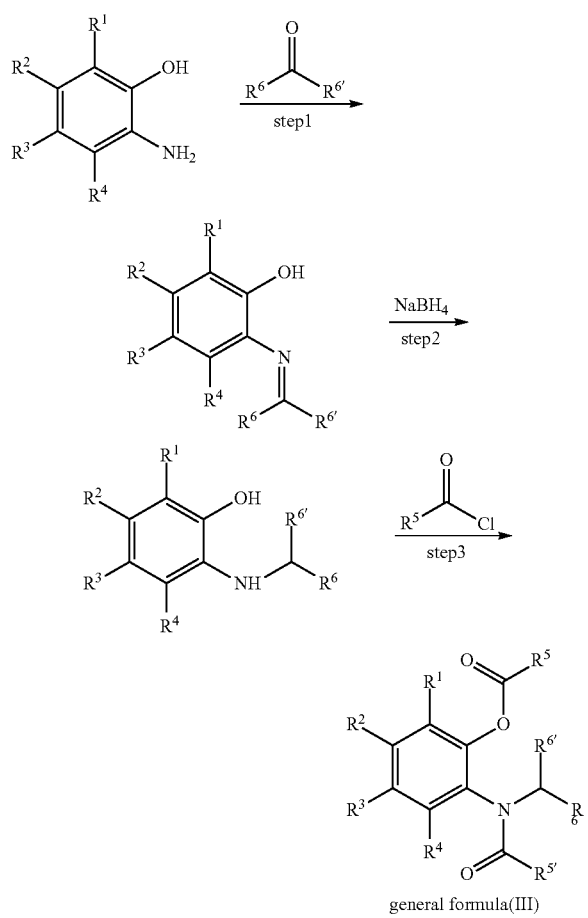

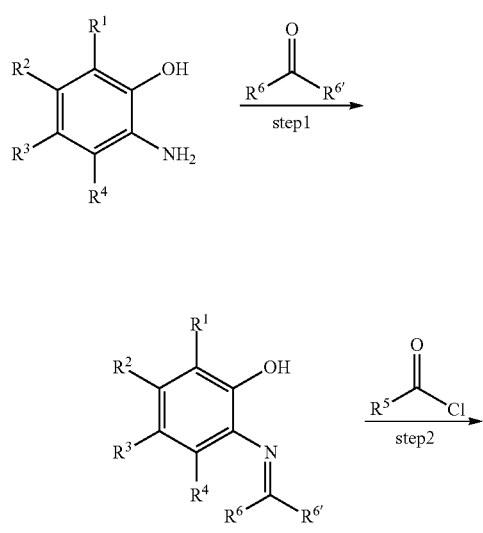

Alternatively, a substituted or unsubstituted o-aminophenol can be reacted with an aldehyde or a ketone, followed by a reaction with an acid chloride or a chloroformate to give a compound of the general formula (IV):

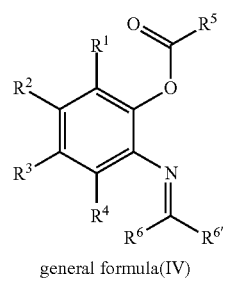

general formula(IV)

The solid catalyst component of the present invention may further comprise, in addition to the 2-substituted amino-phenyl ester compound A of the general formula (I), at least another electron donor compound B, which is selected from the group consisting of a Lewis base compound containing one or more electronegative groups, wherein the electron donor atom is selected from the group consisting of N, O, S, P, As or Sn, preferably from diethers, esters, diketones and diamine electron donor compounds. When a 2-substituted amino-phenyl ester compound is used together with other above-mentioned disclosed internal electron donor compounds, a catalyst having an adjustable performance can be obtained.

The molar ratio of electron donors A and B is from 0.01 to 100, preferably from 0.02 to 50, more preferably from 0.5 to 20.

The Lewis base electron donor compound B is preferably selected from the group consisting of 1,3-diethers of the general formula (V):

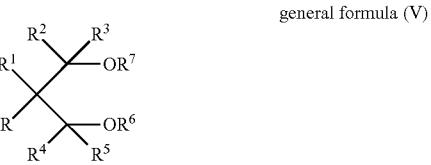

general formula (V)

wherein, R, $R^1$, $R^2$, $R^3$, $R^4$ and $R^5$ may be the same or different and represent H or $C_1$-$C_{18}$ linear or branched alkyl, cycloalkyl, aryl, alkylaryl or aralkyl. $R^6$ and $R^7$ may be the same or different and represent a straight or branched $C_1$-$C_{20}$ alkyl, $C_3$-$C_{20}$ cycloalkyl, $C_5$-$C_{20}$ aryl, $C_7$-$C_{20}$ alkaryl and $C_7$-$C_{20}$ aralkyl; one or more of R to $R^7$ may be linked to form a cyclic structure, each of which may comprise one or more heteroatoms selected from the group consisting of halogen, N, O, S, P and Si.

Specific examples of ethers which can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-di-neopentyl-1,3-dimethoxypropane, 2-iso-propyl-2-isopentyl-1,3-dimethoxypropane, 2-phenyl-2-benzyl-1,3-dimethoxypropane, 2-cyclohexyl-2-cyclohexylmethyl-1,3-dimethoxypropane. 1,1-bis(methoxymethyl)-cyclopentadiene; 1,1-bis(methoxymethyl)-2,3,4,5-tetramethylcyclopentadiene; 1,1-bis(methoxymethyl)-2,3,4,5-tetraphenylcyclopentadiene; 1,1-bis(methoxymethyl)-2,3,4,5-tetrafluorocyclopentadiene; 1,1-bis(methoxymethyl)-3,4-dicyclopentylcyclopentadiene; 1,1-bis(methoxymethyl) indene; 1,1-di(methoxymethyl)-2,3-dimethylindene; 1,1-bis(methoxymethyl)-4,5,6,7-tetrahydroindene; 1,1-bis(methoxymethyl)-2,3,6,7-tetrafluoroindene; 1,1-bis(methoxymethyl)-4,7-dimethylindene; 1,1-bis(methoxymethyl)-3,6-dimethylindene; 1,1-bis(methoxymethyl)-4-phenylindene; 1,1-bis(methoxymethyl)-4-phenyl-2-methylindene; 1,1-bis(methoxymethyl)-4-cyclohexylindene; 1,1-bis(methoxymethyl)-7-(3,3,3-trifluoropropyl)indene 1,1-bis(methoxymethyl)-7-trimethylsilylindene; 1,1-bis(methoxymethyl)-7-trifluoromethylindene; 1,1-bis(methoxymethyl)-4,7-dimethyl-4,5,6,7-tetrahydroindene; 1,1-bis (methoxymethyl)-7-methoxyindene; 1,1-bis (methoxymethyl)-7-cyclopentylindene; 1,1-bis (methoxymethyl)-7-isopropylindene; 1,1-bis (methoxymethyl)-7-cyclohexylindene; 1,1-bis (methoxymethyl))-7-tert-butylindene; 1,1-bis (methoxymethyl)-7-tert-butyl-2-methylindene; 1,1-bis (methoxymethyl)-7-phenylindene; 1,1-di(methoxymethyl)-2-phenylindene; 1,1-bis(methoxymethyl)-1H-benzo[e] indene; 1,1-bis(methoxymethyl)-1H-2-methylbenzo[e] indene; 9,9-bis(methoxymethyl)fluorene; 9,9-bis (methoxymethyl)-2,3,6,7-tetramethylfluorenne; 9,9-bis (methoxymethyl)-2,3,4,5,6,7-hexafluorofluorene; 9,9-bis (methoxymethyl)-2,3-benzofluorene; 9,9-bis (methoxymethyl)-2,3,6,7-dibenzofluorene; 9,9-bis (methoxymethyl)-2,7-diisopropylfluorene; 9,9-bis (methoxymethyl)-1,8-dichlorofluorene; 9,9-bis (methoxymethyl)-2,7-dicyclopentylfluorene; 9,9-bis (methoxymethyl)-1,8-difluorofluorene; 9,9-bis (methoxymethyl)-1,2,3,4-tetrahydrofluorene; 9,9-bis (methoxylmethyl)-1,2,3,4,5,6,7,8-octahydrofluorene; 9,9-bis(methoxymethyl)-4-tert-butylfluorene.

The Lewis base electron doner compound B is preferably a monocarboxylic acid ester or a polycarboxylic acid ester compound, and specific examples are an aromatic dicarboxylic acid compound and an aliphatic dicarboxylic acid ester compound:

a diester of an aromatic dicarboxylic acid such as a diethyl phthalate or a diethyl terephthalate. The diethyl phthalate includes: dimethyl phthalate, diethyl phthalate, di-n-propyl phthalate, diisopropyl phthalate, di-n-butyl phthalate, diisobutyl phthalate, methyl ethyl phthalate, methyl isopropyl phthalate, methyl n-propyl phthalate, ethyl n-butyl phthalate, ethyl isobutyl phthalate, di-n-pentyl phthalate, diisopentyl phthalate, dihexyl phthalate, di-n-heptyl phthalate, n-octyl phthalate, diisooctyl phthalate, (2,2-dimethylhexyl)phthalate, (2-ethylhexyl)phthalate, di-n-nonyl phthalate, diisodecyl phthalate, (2,2-dimethylheptyl)phthalate, n-butyl isohexyl phthalate, n-butyl (2-ethylhexyl)phthalate, n-pentyl n-hexyl phthalate, n-pentyl isononyl phthalate, isopentyl n-decyl phthalate, n-pentyl undecyl phthalate, isopentyl isohexyl phthalate, n-hexyl (2-methylhexyl)phthalate, n-hexyl (2-ethylhexyl)phthalate, n-hexyl isononyl phthalate, n-hexyl n-decyl phthalate, n-heptyl (2-ethylhexyl) phthalate, n-heptyl isononyl phthalate, n-heptyl n-nonyl phthalate and 2-ethylhexyl isononyl phthalate. These esters may be used alone or in combination of two or more. Diethyl terephthalate includes: dimethyl terephthalate, diethyl terephthalate, di-n-propyl terephthalate, diisopropyl terephthalate, di-n-butyl terephthalate, diisobutyl terephthalate, ethyl methyl terephthalate, methyl isopropyl terephthalate, ethyl (n-propyl)terephthalate, ethyl (n-butyl)terephthalate, ethyl (isobutyl)terephthalate, di-n-pentyl terephthalate, diisopentyl terephthalate, dihexyl terephthalate, di-n-heptyl terephthalate, di-n-octyl terephthalate, di-iso-octyl terephthalate, di(2,2-dimethylhexyl) terephthalate, di(2-ethylhexyl) terephthalate, di-n-nonyl terephthalate, diisononyl terephthalate, diisodecyl terephthalate, di(2,2-dimethylethylheptyl) terephthalate, n-butyl isohexyl terephthalate, n-butyl (2-ethylhexyl) terephthalate, n-pentyl n-hexyl terephthalate, n-pentyl isohexyl terephthalate, isopentyl (heptyl) terephthalate, terephthalic acid, n-pentyl (2-ethylhexyl) terephthalate, n-pentyl (isononyl) terephthalate, isopentyl (n-decyl) terephthalate, n-pentyl undecyl terephthalate, isoopentyl isohexyl terephthalate, n-hexyl (2-ethylhexyl) terephthalate, n-hexyl (isononyl) terephthalate, n-hexyl (n-decyl) terephthalate, n-heptyl (2-ethylhexyl) terephthalate, n-heptyl (isononyl) terephthalate, n-heptyl (neodecyl) terephthalate, and 2-ethylhexyl (isononyl) terephthalate. These esters may be used alone or in combination of two or more.

Among these diesters, it is recommended to use one or more of diethyl phthalate, dipropyl phthalate, diisopropyl terephthalate, di-n-butyl phthalate, diisobutyl phthalate, di-n-octyl phthalate, diisooctyl phthalate, di-n-butyl terephthalate, diisobutyl terephthalate, di-n-octyl terephthalate, diisooctyl terephthalate, di(2-ethylhexyl) terephthalate or diisodecyl phthalate.

Particularly preferred among the polycarboxylic acid ester compounds are selected from succinate compounds of the general formula (VI):

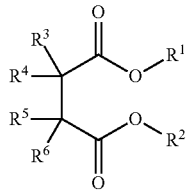

general formula (VI)

wherein the groups $R^1$ and $R^2$ are the same or different, which are $C_1$-$C_{20}$ linear or branched alkyl, alkenyl, cycloalkyl, aryl, aralkyl or alkaryl groups, and optionally comprises a hetero atom; at least two of $R^3$-$R^6$ are different from hydrogen and are selected from $C_1$-$C_{20}$ linear or branched alkyl, alkenyl, cycloalkyl, aryl, aralkyl or alkaryl group, optionally, a hetero atom is included, and in addition, the groups $R^3$-$R^6$ may be bonded together to form a ring. $R^1$ and $R^2$ are preferably a $C_1$-$C_8$ (alkyl, cycloalkyl, aryl, aralkyl and alkaryl group). Particularly preferred are compounds wherein $R^1$ and $R^2$ are selected from primary alkyl groups, especially branched primary alkyl groups. Examples of suitable $R^1$ and $R^2$ are methyl, ethyl, n-propyl, n-butyl, isobutyl, neopentyl, 2-ethylhexyl. Particularly preferred are ethyl, isobutyl and neopentyl.

One of the preferred classes of compounds represented by the general formula (VI) is one in which $R^3$-$R^5$ are hydrogen and $R^6$ is a $C_3$-$C_{10}$ group (branched alkyl, cycloalkyl, aryl, aralkyl, alkaryl). Particularly preferred are compounds wherein $R^6$ is a $C_3$-$C_{10}$ group (branched primary alkyl or cycloalkyl). Specific examples of suitable monosubstituted succinate compounds are diethyl sec-butyl succinate, diethyl hexyl succinate, diethyl cyclopropyl succinate, diethyl norbornyl succinate, diethyl perhydrosuccinate, diethyl trimethyl succinate, diethyl methoxy succinate, diethyl p-methoxyphenyl succinate, diethyl p-chlorophenyl succinate, diethyl phenyl succinate, diethyl cyclohexyl succinate, diethyl benzyl succinate, diethyl cyclohexylmethyl succinate, diethyl t-butyl succinate, diethyl isobutyl succinate, diethyl isopropyl succinate, diethyl neopentyl succinate, diethyl isopentyl succinate, diethyl (1-trifluoromethylethyl) succinate, diethyl fluorenyl succinate, 1-(ethoxycarbo diisobutyl) phenylsuccinate, diisobutyl sec-butyl succinate, diisobutyl hexyl succinate, diisobutyl cyclopropyl succinate, diisobutyl norbornyl succinate, diisobutyl perhydrosuccinate, trimethylsilyl succinate, diisobutyl methoxysuccinate, diisobutyl p-methoxyphenylsuccinate, diisobutyl p-chlorophenoxysuccinate, diisobutyl cyclohexyl succinate, diisobutyl benzyl succinate, diisobutyl cyclohexyl succinate, diisobutyl t-butyl succinate, diisobutyl isobutyl succinate, diisobutyl isopropyl succinate, diisobutyl neopentyl succinate, diisobutyl isopentyl succinate, di-isobutyl (1-trifluoromethylethyl) succinate, diisobutyl fluorenyl succinate, di-neopentyl sec-butyl succinate, di-neopentyl hexyl succinate, di-neopentyl cyclopropyl succinate, di-pneoentyl norbornyl succinate, di-neopentyl perhydrosuccinate, di-neopentyl trimethylsilyl succinate, di-neopentyl methoxysuccinate, di-neopentyl p-methoxyphenylsuccinate, di-neopentyl p-chlorophenylsuccinate, di-neopentyl phenylsuccinate, di-neopentyl cyclohexyl succinate, di-neopentyl benzyl succinate, di-neopentyl cyclohexylmethyl succinate, di-neopentyl t-butyl succinate, di-neopentyl isobutyl succinate, di-neopentyl isopropyl succinate, di-neopentyl neopentyl succinate, di-neopentyl isopentyl succinate, di-neopentyl (1-trifluoromethylethyl) succinate, di-neopentyl fluorenyl succinate.

Another preferred class of compounds among the compounds of the general formula (VI) is one in which at least two of $R^3$-$R^6$ are different from hydrogen and are selected from $C_1$-$C_{20}$ group (linear or branched alkyl, alkenyl, cycloalkyl, aryl, aralkyl or alkaryl) and optionally a heteroatom is included. Particularly preferred are compounds in which two non-hydrogen groups are attached to the same carbon atom. Specific examples of suitable disubstituted succinates are: diethyl 2,2-dimethylsuccinate, diethyl 2-ethyl-2-methylsuccinate, diethyl 2-benzyl-2-isopropyl succinate, diethyl cyclohexylmethyl-2-isobutylsuccinate, diethyl 2-cyclopentyl-2-n-butylsuccinate, diethyl 2,2-diisobutylsuccinate, diethyl 2-cyclohexyl-2-ethylsuccinate, diethyl 2-isopropyl-2-methylsuccinate, diethyl 2-tetradecyl-2-ethylsuccinate, diethyl 2-isobutyl-2-ethylsuccinate, diethyl 2-(1-trifluoromethylethyl)-2-methylsuccinate, diethyl 2-isopentyl-2-isobutylsuccinate, diethyl 2-phenyl-2-n-butylsuccinate, diisobutyl 2,2-dimethylsuccinate, diisobutyl 2-ethyl-2-methylsuccinate, diisobutyl 2-benzyl-2-isopropylsuccinate, diisobutyl 2-cyclohexylmethyl-2-isobutylsuccinate, diisobutyl 2-cyclopentyl-2-n-butylsuccinate, diisobutyl 2,2-diisobutylsuccinate, diisobutyl 2-cyclohexyl-2-ethylsuccinate, diisobutyl 2-isopropyl-2-methyl succinate, diisobutyl 2-tetradecyl-2-ethylsuccinate, diisobutyl 2-isobutyl-2-ethylsuccinate, diisobutyl 2-(1-trifluoromethylethyl)-2-methylsuccinate, diisobutyl 2-isopentyl-2-isobutylsuccinate, diisobutyl 2-phenyl-2-n-butylsuccinate, di-neopentyl 2,2-dimethylsuccinate, di-neopentyl 2-ethyl-2-methylsuccinate, di-neopentyl 2-benzyl-2-isopropylsuccinate, di-neopentyl 2-cyclohexylmethyl-2-isobutylsuccinate, di-neopentyl 2-cyclopentyl-2-n-butylsuccinate, di-neopentyl 2,2-diisobutylsuccinate, di-neopentyl 2-cyclohexyl-2-ethylsuccinate, di-neopentyl 2-isopropyl-2-methylsuccinate, di-neopentyl 2-tetradecyl-2-ethylsuccinate, di-neopentyl 2-isobutyl-2-ethylsuccinate, di-neopentyl 2-(1-trifluoromethylethyl)-2-methylsuccinate, di-neopentyll 2-isopentyl-2-isobutylsuccinate, di-neopentyl 2-phenyl-2-n-butylsuccinate.

Further, compounds are also particularly preferred in which at least two non-hydrogen groups are attached to different carbon atoms, namely $R^3$ and $R^5$ or $R^4$ and $R^6$. Specific examples of suitable compounds are diethyl 2,3-di(trimethylsilyl)succinate, diethyl 2-sec-butyl-3-methylsuccinate, diethyl 2-(3,3,3-trifluoropropyl)-3-methylsuccinate, diethyl 2,3-di(2-ethylbutyl) succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-di(cyclohexylmethyl)succinate, diethyl 2,3-di-tert-butylsuccinate, diethyl 2,3-diisobutylsuccinate, diethyl 2,3-di-neopentylsuccinate, diethyl 2,3-diisopentylsuccinate, diethyl 2,3-di(1-trifluoromethylethyl)succinate, diethyl 2,3-di(tetradecyl)succinate, diethyl 2,3-difluorenylsuccinate, diethyl 2-isopropyl-3-isobutylsuccinate, diethyl 2-tert-butyl-3-isopropylsuccinate, diethyl 2-isopropyl-3-cyclohexylsuccinate, diethyl 2-isopentyl-3-cyclohexylsuccinate, diethyl 2-tetradecyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diethyl 2,2,3,3-tetrafluorosuccinate, diisobutyl 2,3-di(trimethylsilyl)succinate, disobutyl 2-sec-butyl-3-methylsuccinate, diisobutyl 2-(3,3,3-trifluoropropyl)-3-methylsuccinate, disobutyl 2,3-di(2-ethylbutyl)succinate, diisobutyl 2,3-diethyl-2-isopropylsuccinate, diisobutyl 2,3-diisopropyl-2-methylsuccinate, isobutyl 2,3-dicyclohexyl-2-methylsuccinate, diisobutyl 2,3-dibenzylsuccinate, diisobutyl 2,3-diisopropylsuccinate, diisobutyl 2,3-di(cyclohexymethyl)succinate, diisobutyl 2,3-di-tert-butylsuccinate, diisobutyl 2,3-diisobutyl succinate, diisobutyl 2,3-di-neopentyl succinate, diisobutyl 2,3-diisopentylsuccinate, diisobutyl 2,3-di(1-trifluoromethylethyl)succinate, diisobutyl 2,3-di(tetradecyl)succinate, diisobutyl 2,3-difluorenylsuccinate, diisobutyl 2-isopropyl-3-isobutylsuccinate, diisobutyl 2-tert-butyl-3-isopropylsuccinate, diisobutyl 2-isopropyl-3-cyclohexylsuccinate, diisobutyl 2-isopentyl-3-cyclohexylsuccinate, diisobutyl 2-tetradecyl-3-cyclohexylmethyl succinate, diisobutyl 2-cyclohexyl-3-cyclopentylsuccinate, diisobutyl 2,2,3,3-tetramethylsuccinate, diisobutyl 2,2,3,3-tetraethyl succinate, diisobutyl 2,2,3,3-tetrapropyl succinate, diisobutyl 2,3-diethyl-2,3-dipropylsuccinate, diisobutyl 2,2,3,3-tetrafluorosuccinate, di-neopentyl 2,3-di(trimethylsilyl)succinate, di-neopentyl 2-sec-butyl-3-methylsuccinate, di-neopentyl 2-(3,3,3-trifluoropropyl)-3-methylsuccinate, di-neopentyl 2,3-di(2-ethylbutyl)succinate, di-neopentyl 2,3-diethyl-2-isopropylsuccinate, di-neopentyl 2,3-diisopropyl-2-methylsuccinate, di-neopentyl 2,3-dicyclohexyl-2-methylsuccinate, di-neopentyl 2,3-dibenzylsuccinate, di-neopentyl 2,3-diisopropylsuccinate, di-neopentyl 2,3-di(cyclohexylmethyl)succinate, di-neopentyl 2,3-di-tert-butyl succinate, di-neopentyl 2,3-diisobutylsuccinate, di-neopentyl 2,3-di-neopentylsuccinate, di-neopentyl 2,3-diisopentylsuccinate, di-neopentyl 2,3-(1-trifluoromethylethyl)succinate, di-neopentyl 2,3-di(tetradecyl)succinate, di-neopentyl 2,3-difluorenylsuccinate, di-neopentyl 2-isopropyl-3-isobutylsuccinate, di-neopentyl 2-tert-butyl-3-isopropylsuccinate, di-neopentyl 2-isopropyl-3-cyclohexylsuccinate, di-neopentyl 2-isopentyl-3-cyclohexylsuccinate, di-neopentyl 2-tetradecyl-3-cyclohexylmethylsuccinate, di-neopentyl 2-cyclohexyl-3-cyclopentyl succinate, di-neopentyl 2,2,3,3-tetramethylsuccinate, di-neopentyl 2,2,3,3-tetraethylsuccinate, di-neopentyl 2,2,3,3-tetrapropylsuccinate, di-neopentyl 2,3-diethyl-2,3-diisopropylsuccinate, di-neopentyl 2,2,3,3-tetrafluorosuccinate.

As mentioned above, compound of the general formula (VI) in which two or four of the groups $R^3$-$R^6$ attached to the same carbon atom are bonded together to form a ring are also preferred. Specific examples of suitable compounds are 1-(ethoxycarbonyl)-1-(ethoxyacetyl)-2,6-dimethylcyclohexane, 1-(ethoxycarbonyl)-1-(ethoxyacetyl)-2,5-dimethylcyclopentane, 1-(ethoxycarbonyl)-1-(ethoxyacetylmethyl)-2-methylcyclohexane, 1-(ethoxycarbonyl)-1-(ethoxyacetylcyclohexyl)cyclohexane.

The above-mentioned compounds may be used in the form of pure isomers or as a mixture of enantiomers or as a mixture of positional isomers and enantiomers. When pure isomers are to be used, they are typically isolated using conventional techniques well known in the art. In particular, some of the succinates of the invention may be used as a pure racemic or meso form, or alternatively as a mixture of the two.

Further, Lewis base electron donor compound B is preferably selected from diol ester compounds of the general formula (VII):

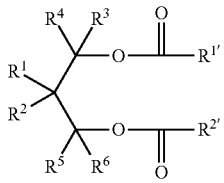

general formula (VII)

wherein $R^1$-$R^6$, $R^{1'}$-$R^{2'}$ are the same or different and can be selected from hydrogen, halogen or a substituted or unsubstituted linear or branched $C_1$-$C_{20}$ alkyl, $C_3$-$C_{20}$ cycloalkyl, $C_6$-$C_{20}$ aryl, $C_7$-$C_{20}$ alkaryl, $C_7$-$C_{20}$ aralkyl, $C_2$-$C_{10}$ alkenyl or $C_{10}$-$C_{20}$ fused ring aryl; but neither $R^{1'}$ nor $R^{2'}$ is hydrogen, and one or more of $R^1$-$R^6$ optionally form a ring or not.

The diol ester compounds may specifically be: 1,3-propanediol dibenzoate, 2-methyl-1,3-propanediol dibenzoate, 2-ethyl-1,3-propanediol dibenzoate, 2-propyl-1,3-propanediol dibenzoate, 2-butyl-1,3-propanediol dibenzoate, 2,2-dimethyl-1,3-propanediol dibenzoate, 2-ethyl-2-butyl-1,3-propanediol dibenzoate, 2,2-diethyl-1,3-propanediol dibenzoate, 2-methyl-2-propyl-1,3-propanediol dibenzoate, 2-isopropyl-2-isopentyl-1,3-propanediol dibenzoate, 2,4-pentanediol dibenzoate, 3-methyl-2,4-pentanediol dibenzoate, 3-ethyl-2,4-pentanediol dibenzoate, 3-propyl-2,4-pentanediol dibenzoate, 3-butyl-2,4-pentanediol dibenzoate, 3,3-dimethyl-2,4-pentanediol dibenzoate, 2-methyl-1,3-pentanediol dibenzoate, 2,2-dimethyl-1,3-pentanediol dibenzoate, 2-ethyl-1,3-pentanediol dibenzoate, 2-butyl-1,3-pentanediol dibenzoate, 2-methyl-1,3-pentanediol dibenzoate, 2-ethyl-1,3-pentanediol dibenzoate, 2-propyl-1,3-pentanediol dibenzoate, 2-butyl-1,3-pentanediol dibenzoate, 2,2-dimethyl-1,3-pentanediol dibenzoate, 2-methyl-1,3-pentanediol dibenzoate, 2,2-dimethyl-1,3-pentanediol dibenzoate, 2-ethyl-1,3-pentanediol dibenzoate, 2-butyl-1,3-pentanediol dibenzoate, 2,2,4-trimethyl-1,3-pentanediol dibenzoate, 3-methyl-3-butyl-2,4-pentanediol dibenzoate, 2,2-dimethyl-1,5-pentanediol dibenzoate, 3,5-heptanediol dibenzoate, 4-ethyl-3,5-heptanediol dibenzoate, etc. Pentanediol ester and heptanediol ester are preferred.

The solid catalyst component for olefin polymerization of the present invention comprises the reaction product of titanium compound, magnesium compound. At least one 2-substituted amino-phenyl ester compound selected from the above, the precursor of said magnesium compound is selected from at least one of: $X_n$Mg(OR)$_{2-n}$, MgCl$_2$·mROH, $R_{2-n}$MgX$_n$, MgCl$_2$/SiO$_2$, MgCl$_2$/Al$_2$O$_3$ or mixture of magnesium halide and titanium alkoxide, wherein m is a number from 0.1 to 6, $0 \leq n \leq 2$, X is halogen, R is $C_1$-$C_{20}$ hydrocarbon group; said titanium compound is represented by general formula TiX$_N$(OR)$_{4-N}$, wherein R is $C_1$-$C_{20}$ hydrocarbon group, X is halogen, N=1-4.

The precursor of magnesium compounds of the present invention preferably utilizes magnesium hydrocarboxide compound.

Another preferred precursor of magnesium compounds of the present invention is alcoholate of magnesium dihalide.

The titanium compounds of the invention include titanium tetrachloride, titanium tetrabromide, titanium tetraiodide and alkyl titanium halide, alkyl titanium halide such as methoxy titanium trichloride, ethoxy titanium trichloride, propoxy titanium trichloride, n-butoxy titanium trichloride, dimethoxy titanium dichloride, diethoxy titanium dichloride, dipropoxy titanium dichloride, di-n-butoxy dichloride titanium, trimethoxy titanium chloride, triethoxy titanium chloride, tripropoxy titanium chloride or tri-n-butoxy titanium chloride. These titanium halides can be used alone or in combination. Titanium tetrachloride is preferably used.

Preparation of the solid catalyst component of the present invention can be carried out according to several methods.

According to one of the methods, a solution of TiCl$_4$ or titanium alkoxide in an aromatic hydrocarbon (e.g., toluene, xylene, etc.), is reacted with magnesium dihydrocarboxide such as magnesium dialkoxide or magnesium diaryloxide or the like at −25-0° C., and halogenated at 80-130° C. Treatment with solution of TiCl$_4$ in an aromatic hydrocarbon can be repeated one or more times and the above mentioned electron doner can be added in one or more batches in the multitime treatments. For example, the preparation can be carried out with reference to the preparation of titanium-containing solid catalyst component as disclosed in U.S. Pat. No. 5,077,357: successively adding magnesium ethoxide, titanium tetraethoxide, o-cresol, ethanol and chlorobenzene with stirring; quickly adding TiCl$_4$/chlorobenzene solution to the above liquid, after heating until complete dissolution, continuing to heat up to a particular temperature; after using $N_2$ bubbling to take away the ethanol reactant, continuing stirring for a certain time, and then washing with a hot chlorobenzene, washing twice with isooctane, then drying by $N_2$ to obtain a carrier. Or in accordance with another example: successively adding $TiCl_4$, titanium tetraethoxide, magnesium ethoxide and o-cresol in chlorobenzene with stirring; adding ethanol and keeping stirring at a high temperatures for 3 h until magnesium ethoxide is dissolved; hot filtering and washing with warm chlorobenzene and then with isooctane, finally drying by $N_2$.

According to another method, magnesium alkoxide or magnesium chloroalkoxide are reacted with an excess of $TiCl_4$ in a solution containing the above mentioned electron doner at a temperature of 80-135° C. According to a preferred method, the titanium compound represented by the general formula $TiX_n(OR)_{4-n}$, wherein R is $C_1$-$C_{20}$ hydrocarbon group, X is halogen, n=1-4; preferably $TiCl_4$, is reacted with the adduct represented by the formula $MgCl_2 \cdot mROH$ to prepare a solid catalyst component, wherein m is a number from 0.1 to 6, preferably from 2 to 3.5, and R is a hydrocarbon group having 1 to 20 carbon atoms. The adduct can be suitably prepared to be sphere shape according to the following method: in the presence of an inert hydrocarbon immiscible with the adduct, alcohol and magnesium chloride are mixed, followed by quickly cooling the emulsion to solidify the adduct in a form of spherical particles. Examples of the spherical $MgCl_2 \cdot mROH$ adduct prepared according to the method can be found in U.S. Pat. No. 4,399,054 and in U.S. Pat. No. 4,469,648. The obtained adduct can be directly reacted with the Ti compound or it can be previously subjected to thermal controlled dealcoholation (80-130° C.) to obtain an adduct in which the mole number of alcohol is generally lower than 3, preferably between 0.1 and 2.5. The adduct (dealcoholated or itself) can be suspended in cold $TiCl_4$ (generally −25-0° C.) to react with the titanium compound; the mixture was heated to 80-130° C. and kept at this temperature for 0.5-2 hours. Treatment with $TiCl_4$ can be repeated one or more times. During the treatment with $TiCl_4$, the 2-substituted aminophenyl ester compounds represented by the general formula (I) may be added and this treatment can be repeated one or more times.

Another method for preparing the solid catalyst component of the present invention includes that anhydrous magnesium chloride and the above mentioned electron doner are grinded together under the condition that activation of the magnesium dichloride occurs. The product thus obtained can be treated with an excess of $TiCl_4$ at a temperature of 80-130° C. one or more times. After treatment the product is washed with a hydrocarbon solvent until no chlorine ions exist. According to a further method, the product obtained by co-grinding anhydrous magnesium dichloride, titanium compound and the above mentioned electron doner is treated with halogenated hydrocarbon such as 1,2-dichloro ethane, chlorobenzene, methylene chloride or the like. This treatment is carried out at a temperature from 40° C. to boiling point of the halogenated hydrocarbon for 1-4 hours. Then the product will be obtained usually by washing with an inert hydrocarbon solvent such as hexane.

According to another method, magnesium dichloride is preactivated according to a known method, and then treated with an excess of $TiCl_4$ at a temperature of about 80-135° C., wherein the solution contains above mentioned electron doner. The solid is treated with $TiCl_4$ repeatedly and washed with hexane to remove any unreacted $TiCl_4$.

A further method comprises the preparation carried out with reference to the preparation of titanium-containing solid catalyst component as disclosed in CN1208045: in the presence of one compound selected from alcohols, phenols, ketones, aldehydes, ethers, amines, pyridine and esters, a liquid magnesium compound is contacted with the liquid titanium compound to precipitate a solid at a low temperature, the temperature of contact is usually at −70-200° C., preferably −30-130° C., during contact, a 2-substituted amino-phenyl ester compound represented by the general formula (I) is added for treatment.

Another method of the solid catalyst component of the present invention comprises: a magnesium compound is dissolved in a solvent system consisting of an organic epoxy compound, an organic phosphine compound and an inert diluent (pentane, hexane, heptane, octane, decane, benzene, toluene, xylene and derivatives thereof or a mixture of any of the above compounds in any ratio, preferably toluene, heptane or hexane) to form a homogeneous solution, which is mixed with the titanium compound to precipitated a solid in the presence of co-precipitation agent; the solid is treated with the above electron doner to allow the unsaturated ring-substituted diacid ester compound to load on the solid, if necessary, and then treated with titanium tetrahalide and an inert diluent, wherein the co-precipitating agent is one of organic acid anhydride, organic acid, ether and ketone. Among the components, based on per mol of magnesium halide, organic epoxy compound is 0.2 to 10 mol, organic phosphine compound is 0.1 to 3 mol, co-precipitation agent is 0 to 1.0 mol, Ti is 0.5 to 150 mol.

The solid catalyst component of the present invention can also be prepared by making magnesium compound load on inorganic oxide as a carrier such as $SiO_2$, alumina or the porous resin, activating by known methods, and then treating with an excess of $TiCl_4$ at a temperature of about 80-135° C., wherein one above mentioned electron doner is added during treatment.

The above reactions result in the formation of magnesium halide in an active form (general crystal magnesium halide has a regular structure, can support little Ti, and thus has low catalytic activity. To prepare a highly active supported catalyst, the magnesium halide must be activated. The activation treatment method includes preparing crystallites by physical and/or chemical methods, such that the active center is supported on the surface, edges and defects of the magnesium halide, and the treated magnesium halide crystallites suitable for supporting Ti are "active magnesium halide"). In addition to these reactions, there are other known methods in the literature which start with a compound different from the magnesium halide to form magnesium halide in an active form.

In any of the production methods, the above electron doner compounds can be directly added or obtained through an optional manner, for example, by use of appropriate precursors to prepare in situ, the appropriate precursors can complete the conversion before ideal electron donor compounds, for example, relying on esterification, transesterification etc. known chemical reactions. Typically, $MgCl_2$ and the above mentioned electron doner are used in the molar ratio of 0.01-5, preferably 0.05-2.0.

In any of the production methods, the above electron donors may be added simultaneously or separately in the preparation process in one or more batches, in any order.

The solid catalyst component of the present invention is converted into a catalyst for olefin polymerization by reaction with an organic aluminum compound according to known methods. In particular, one object of the present invention is to provide a catalyst for olefin CH$_2$=CHR polymerization, wherein R is hydrogen or hydrocarbon group having 1-12 carbon atoms, the catalyst comprises the reaction product of the following materials:

(a) the catalyst component of the present invention, comprising Mg, Ti and a halogen and at least one 2-substituted amino-phenyl ester compound A selected from the above;

(b) at least one organic aluminum compound of the general formula AlR$_n$X$_{(3-n)}$, wherein R is hydrogen, hydrocarbon group having 1-20 carbon atoms; X is halogen, n is an integer of 0≤n≤3; and, optionally, (c) at least one external electron donor compound.

Preferably, the alkylaluminum compound (b) is selected from the group consisting of trialkylaluminum compound such as trimethylaluminum, triethylaluminum, triisobutylaluminum, tri-n-butyl aluminum, tri-n-hexyl aluminum, trioctyl aluminum. It is also possible to use trialkylaluminum and alkylaluminum halide, or a mixture of alkylaluminum sesquichloride such as AlEt$_2$Cl and Al$_2$Et$_3$Cl$_3$, alkylaluminoxanes can also be used.

For the application required for good isotacticity, an external electron donor compound can be used. The external electron donor is selected from siloxane compounds represented by general formula R$_n$Si(OR$_1$)$_{4-n}$, wherein R and R$_1$ are C$_1$-C$_{18}$ hydrocarbon group, optionally heteroatoms; n is an integer of 0≤n≤3.

Said specific silane compounds may be: trimethylmethoxysilane, trimethylethoxysilane, tri-n-propylmethoxysilane, tri-n-propylethoxysilane, tri-n-butylmethoxysilane, triisobutylethoxysilane, trihexylmethylsilane, trihexylethoxysilane, dimethyldimethoxysilane, dimethyldiethoxysilane, di-n-propyldimethoxysilane, diisopropyldimethoxysilane, di-n-propyldiethoxysilane, diisopropyldiethoxysilane, di-n-butyldiethoxysilane, diisobutyldiethoxysilane, di-tert-butyldimethoxysilane, di-tert-butyldimethoxysilane, di-n-butyldimethoxysilane, diisobutyldimethoxysilane, di-tert-butyldiethoxysilane, di-n-butyldiethoxysilane, n-butylmethyldimethoxysilane, di(2-ethylhexyl)dimethoxysilane, di(2-ethylhexyl)diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexylisopropyldimethoxysilane, cyclohexylethyldiethoxysilane, cyclopentylmethyldimethoxysilane, cyclopentylethyldiethoxysilane, cyclopentylisopropyldiethoxysilane, cyclopentylisobutyldimethoxysilane, cyclohexyln-propyldimethoxysilane, cyclohexyln-propyldiethoxysilane, cyclohexyln-butyldiethoxysilane, pentylmethyldimethoxysilane, pentylmethyldiethoxysilane, pentylethyldimethoxysilane, pentylethyldiethoxysilane, cyclohexyldimethylmethoxysilane, cyclohexyldiethylmethoxysilane, cyclohexyldiethylmethoxysilane, cyclohexyldiethylethoxysilane, 2-ethylhexyltrimethoxysilane, cyclohexyldimethoxysilane, cyclohexyldiethoxysilane, 2-ethylhexyltriethoxysilane, ethyltrimethoxysilane, ethyltriethoxysilane, n-propyltrimethoxysilane, n-propyltriethoxysilane, isopropyltrimethoxysilane, isopropyltriethoxysilane, n-butyltrimethoxysilane, isobutyltrimethoxysilane, tert-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, pentyltrimethoxysilane, pentyltriethoxysilane, tetramethoxysilane, tetraethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcy clohexylcy clopentyldimethoxysilane, 3,5-dimethylcyclohexylcyclopentyldimethoxysilane, 3-methylcyclohexylcyclohexyldimethoxysilane, di(3-methylcyclohexyl) dimethoxysilane, 4-methylcyclohexylcyclohexyldimethoxysilane, di(4-methylcyclohexyl)dimethoxysilane, 3,5-dimethylcyclohexylcyclohexyldimethoxysilane, di(3,5-dimethylcyclohexyl)dimethoxysilane, tetrapropoxysilane, tetrabutoxysilan. The preferable compound among these organosilicon compounds are: di-n-propyldimethoxysilane, diisopropyldimethoxysilane, di-n-butyldimethoxysilane, diisobutyldimethoxysilane, di-tert-butyldimethoxysilane, di-n-butyldiethoxysilane, tert-butyltrimethoxysilane, dicyclohexyldimethoxysilane, dicyclohexyldiethoxysilane, cyclohexylmethyldimethoxysilane, cyclohexylethyldiethoxysilane, cyclohexylethyldimethoxysilane, cyclohexylethyldiethoxysilane, cyclopentylmethyldimethoxysilane, cyclopentylmethyldiethoxysilane, cyclopentylethyldimethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane and 3,5-dimethylcyclopentyldimethoxysilane, etc. These compounds C can be used alone or in combination.

Preferred examples of silicon compounds are cyclohexylmethyl dimethoxysilane; diisopropyl dimethoxysilane; di-n-butyl dimethoxysilane; diisobutyl dimethoxysilane; diphenyl dimethoxysilane; phenyltriethoxysilane; methyl tert-butyl dimethoxysilane; dicyclopentyl dimethoxysilane; 2-ethylpiperidin-2-t-butyl-dimethoxysilane and (1,1,1-trifluoro-2-propyl)-2-ethylpiperidine dimethoxysilane and (1,1,1-trifluoro-2-propyl)-methyldimethoxysilane, cyclohexyl trimethoxysilane; tert-butyl trimethoxysilane and tert-hexyl trimethoxysilane.

The catalysts of the present invention can be used for olefin CH$_2$=CHR(co)polymerization, the olefin is ethylene, propylene, 1-butene, 4-methyl-1-pentene, 1-hexene and 1-octene.

In order to apply the catalysts of the present invention for olefin polymerization, the catalyst prepared by component a, b or c can be used for both homo-polymerization and co-polymerization. Typically the molar ratio of Al in component b to Ti in component a is 1-1000, preferably 50-800; when component c is contained, the molar ratio of component c to component b is 0.002-10, preferably 0.01-2, more preferably 0.01-0.5.

The catalyst of the present invention for olefin polymerization preferably comprises the following components or reaction products of the following components, that is, no external electron donor is required:

a) the above solid catalyst component;

b) at least one organoaluminum compound of the formula AlR$_n$X$_{(3-n)}$ wherein R is hydrogen, a hydrocarbon group having 1 to 20 carbon atoms; X is a halogen, and n is an integer of 0≤n≤3.

The olefin polymerization, homopolymerization and copolymerization preferably employ only the above-mentioned catalyst prepared by the components a and b, and the molar ratio of Al in the component b to Ti in the component a is from 1 to 1000 mol, preferably from 50 to 800.

The addition order of the components is arbitrary, it is preferred to add component b firstly to the polymerization system, and then component a; when component c is used, it is preferred to add component b, then component c, and component a as the last.

The polymerization process of the present invention can be carried out with or without the presence of a solvent. Olefin monomers may be gaseous or liquid phase. Hydrogen can be further added as a molecular weight modifier. Of course, the polymerization can also be carried out without the presence of molecular weight modifier. The polymerization temperature is not higher than 200° C., preferably 20-100° C., and more preferably 40-80° C. The polymerization pressure is not more than 10 MPa, preferably 1-5 MPa. Both continuous polymerization and batch polymerization process can be applied. The polymerization reaction can be divided into one, two or more stages.

The olefins to be homopolymerized or copolymerized using the catalyst of the present invention include, linear olefins: ethylene, propylene, 1-butene, 1-pentene, 1-hexene, 1-heptene, 1-nonene, 1-decene; branched olefins such as: 3-methyl-1-butene and 4-methyl-1-pentene; dienes such as: butadiene, vinyl cyclopentene and vinyl cyclohexene. The catalyst of the present invention is preferably applied to polyethylene and polypropylene. These olefins may be used alone or in combination.

In terms of the olefin polymerization conducted by using the catalyst component a, b, c of the present invention (hereinafter referred to as the main polymerization), a prepolymerization is recommended to increase the isotacticity, particle properties and so on of the activity polymer of the catalysts. The prepolymerization can also be used for styrene homopolymerization.

In the prepolymerization process, the addition order of each component and monomer is arbitrary. Preferably the component b is firstly added to the system containing an inert gas or olefins to be polymerized, and then one or more olefins to be polymerized are added after addition of component a. In the process of olefin prepolymerization using organosilane, it is recommended that component b is added to the polymerization system of an inert gas or olefins to be polymerized, and then component C, and then component a, the olefins are added last.

The present invention utilizes bifunctional compounds having a specific structure, i.e., ring-substituted diacid ester compounds as shown in the general formula (I), since the oxygen of the ester bond has a strong coordination effect and is relatively stable during the preparation of the catalyst, therefore playing an active and effective role in the activity and isotacticity of the catalysts.

When the 2-substituted amino-phenyl ester compound and another Lewis base compound are used as the internal electron donor, especially when combined with the diether compound, the activity of the obtained catalyst is significantly higher than that of use of either the separate use of 2-substituted amino-phenyl ester compound or a diether compound, and the obtained polyolefin has a moderate molecular weight distribution, and can overcome the disadvantage that the diether catalyst has a high activity but a narrow molecular weight distribution of the polymer. The polymer obtained in this type of catalyst component still has a high isotacticity without using an external electron donor and a lower polyolefin ash, and the catalyst has an ultrahigh activity and maintains a high level of activity as the polymerization time is extended. When the 2-substituted amino-phenyl ester compound and the succinate compound are compounded as an internal electron donor, the molecular weight distribution of the obtained polyolefin can be further broadened, and the catalyst is suitable for the preparation of a polymer product with a broad molecular weight distribution. In addition, when the 2-substituted amino-phenyl ester compound is compounded with other common electron donor compounds, the properties are improved to different extents, and the compounding of the phthalate compound or the diol ester compound can improve the isotacticity of the polymer.

Embodiments

The invention will be described in detail below by way of examples, but the invention is not limited thereto.

The compounds listed in the examples are merely illustrative of the invention and are not intended to exclude other compounds within the scope of the invention but are not mentioned in the examples.

The terms used herein is for the purpose of illustration of the description and are not intended to limit the invention. Unless otherwise defined, all terms (including technical and scientific terms) used herein have the same meanings as those skilled in the art understand. It must also be clear that, unless explicitly defined herein, terms such as those generally defined in a dictionary should be interpreted as having a consistent meaning in the context of the present description and the related art, and should not be interpreted as idealized or too formalized.

Determination of Polymer Isotacticity

It was determined by heptane extraction (heptane boiling extraction for 6 hours). 2 g of the dried polymer sample was placed in an extractor and extracted with boiling heptane for 6 hours. The ratio of the weight of the polymer (g) after drying the residue to constant weight to 2 was isotacticity.

Determination of Molecular Weight Distribution of Polymer

The determination was carried out by PL-220 gel permeation chromatography using trichlorobenzene as a solvent at 150° C. (standard sample: polystyrene, flow rate 1.0 mL/min, column: 3×Plgel 10 um M1Xed-B 300×7.5 nm).

Determination of Polymer Ash

The determination was carried out according to GB/T 9345.1-2008.

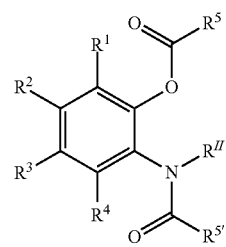

general formula (II)

TABLE 1

| Compound | | general formula (II) structure | | |
|---|---|---|---|---|
| No. | Name of internal electron donor compound | $R^1, R^2, R^3, R^4$ | $R^{II}$ | $R^5, R^{5'}$ |
| A1 | 2-benzamide-phenyl benzoate | are all H | H | are both $C_6H_5$ |

TABLE 1-continued

| Compound No. | Name of internal electron donor compound | $R^1$, $R^2$, $R^3$, $R^4$ | $R^{II}$ | $R^5$, $R^{5'}$ |
|---|---|---|---|---|
| A2 | 2-[N-benzamide-N-methyl]-4-tert-butyl-phenyl isopropyl benzoate | $R^3$ is $CH_3$, the rest are all H | $CH_3$ | $R^5$ is $^iC_3H_7$ $R^{5'}$ is $C_6H_5$ |
| A3 | 2-phenyloxycarboxamide-4-ethyl-phenyl phenoxycarboxylate | $R^3$ is $C_2H_5$, the rest are all H | H | are both $OC_6H_5$ |
| A4 | 2-benzamide-4-tert-butyl-phenyl benzoate | $R^3$ is $^tC_4H_9$, the rest are all H | H | are both $C_6H_5$ |
| A5 | 2-benzamide-4-methyl-6-methyl-phenyl benzoate | $R^1$, $R^3$ is $CH_3$, the rest are all H | H | are both $C_6H_5$ |
| A6 | 2-n-butyloxycathonylamide-4-chloro-phenyl butoxycarboxylate | $R^3$ is Cl, the rest are all H | H | are both $OC_4H_9$ |
| A7 | 1-benzamide-2-phenyl benzoate | $R^1$, $R^2$ is H, $R^3$ and $R^4$ are bonded to a benzene ring | H | are both $C_6H_5$ |
| A8 | 2-n-hexanoamide-phenyl hexanoate | are all H | H | are both $C_5H_{11}$ |
| A9 | 2-furancarboxamide-phenyl furancarboxylate | are all H | H | are both $C_5H_3O$ |
| A10 | 2-m-chlorobenzamide-m-chlorobenzoate | are all H | H | are both $m\text{-}C_6H_4Cl$ |
| A11 | 2-p-methoxybenzamide-4-tert-butyl-p-methoxybenzoate | $R^3$ is $^tC_4H_9$, the rest are all H | H | are both $p\text{-}C_6H_4OCH_3$ |
| A12 | 2-p-methylbenzamide-4-tert-butyl-p-methylbenzoate | $R^3$ is $^tC_4H_9$, the rest are all H | H | are both $p\text{-}C_6H_4CH_3$ |
| A47 | 2-[N-benzamide-N-tert-butyl]-phenyl benzoate | are all H | $^tC_4H_9$ | are both $C_6H_5$ |
| A48 | 2-[N-benzamide-N-phenyl]-4-tert-butyl-phenyl benzoate | $R^3$ is $^tC_4H_9$, the rest are all H | $C_6H_5$ | are both $C_6H_5$ |
| A49 | 2-[N-benzamide-N-tert-butyl]-4-tert-butyl-phenyl benzoate | $R^3$ is $^tC_4H_9$, the rest are all H | $^tC_4H_9$ | are both $C_6H_5$ |
| A52 | 2-[N-phenoxycarboxamide-N-phenyl]-4-tert-butyl-phenyl phenoxycarboxylate | $R^3$ is $^tC_4H_9$, the rest are all H | $C_6H_5$ | are both $C_6H_5O$ |

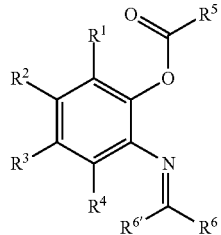

general formula (IV)

TABLE 2

| Compound No. | Name of internal electron donor compound a | $R^1$, $R^2$, $R^3$, $R^4$ | $R^5$ | $R^6$, $R^{6'}$ |
|---|---|---|---|---|
| A13 | 2-benzylimine-phenyl benzoate | are all H | $C_6H_5$ | $R^6$ is H, $R^{6'}$ is $C_6H_5$ |
| A14 | 2-dibenzylimine-phenyl isobutyrate | are all H | $C_3H_{17}$ | are both $C_6H_5$ |
| A15 | 2-phenylethylimine-phenyl cyclohexanecarboxylate | are all H | $C_6H_{11}$ | $R^6$ is H, $R^{6'}$ is $C_6H_5CH_2$ |
| A16 | 2-n-hexaneimine-phenyl phenoxycalboxylate | are all H | $OC_6H_5$ | $R^6$ is H, $R^{6'}$ is $C_5H_{11}$ |
| A17 | 2-n-butylimine-4-methyl-phenyl n-octyloxycarboxylate | $R^3$ is $CH_3$, the rest are all H | $OC_8H_{17}$ | $R^6$ is H, $R^{6'}$ is $C_3H_7$ |
| A18 | 2-benzimide-4-ethyl-phenyl p-methoxybenzoate | $R^3$ is $C_2H_5$, the rest are all H | $p\text{-}C_6H_4OCH_3$ | $R^6$ is H, $R^{6'}$ is $C_6H_5$ |
| A19 | 2-benzylimine-4-tert-butyl-phenyl benzoate | $R^3$ is $^tC_4H_9$, the rest are all H | $C_6H_5$ | $R^6$ is H, $R^{6'}$ is $C_6H_5$ |
| A20 | 2-p-chlorobenzylimine-4-tert-butyl-phenyl p-chlorobenzoate | $R^3$ is $^tC_4H_9$, the rest are all H | $p\text{-}C_6H_3Cl$ | $R^6$ is H, $R^{6'}$ is $p\text{-}C_6H_4Cl$ |

TABLE 2-continued

| Compound No. | Name of internal electron donor compound a | General formula (IV) stucture | | |
|---|---|---|---|---|
| | | $R^1, R^2, R^3, R^4$ | $R^5$ | $R^6, R^{6'}$ |
| A21 | 2-cyclohexylmethylimine-4-tert-butyl-phenyl benzoate | $R^3$ is $^tC_4H_9$, the rest are all H | $C_6H_5$ | $R^6$ is H, $R^{6'}$ is $C_6H_{11}$ |
| A22 | 2-dibenzylimine-4-methyl-6-methyl-phenyl benzoate | $R^1, R^3$ is $CH_3$, the rest are all H | $C_6H_5$ | are both $C_6H_5$ |
| A23 | 2-m-chlorobenzyliimine-4-chloro-phenyl m-chlorobenzoate | $R^3$ is Cl, the rest are all H | $o\text{-}C_6H_4Cl$ | $R^6$ is H, $R^{6'}$ is $o\text{-}C_6H_4Cl$ |
| A24 | 1-benzylimine-2-naphthyl benzoate | $R^1, R^2$ is H, $R^3$ and $R^4$ are bonded to a benzene ring | $C_6H_5$ | $R^6$ is H, $R^{6'}$ is $C_6H_5$ |

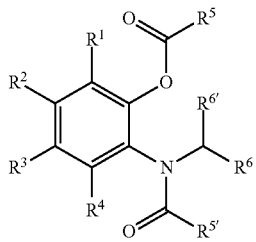

general formula (III)

TABLE 3

| Example No. | Name of internal electron donor a | General formula (III) structure | | |
|---|---|---|---|---|
| | | $R^1, R^2, R^3, R^4$ | $R^5\text{-}R^{5'}$ | $R^6\text{-}R^{6'}$ |
| A25 | 2-[N-benzoyl-N-benzyl]-phenyl benzoate | are all H | are $C_6H_5$ | $R^6$ is H, $R^{6'}$ is $C_6H_5$ |
| A26 | 2-(1-naphthoyl-N-benzyl)-(1-naphthoic acid) phenyl ester | are all H | are $C_{12}H_7$ | $R^6$ is H, $R^{6'}$ is $C_6H_5$ |
| A27 | 2-[N-m-chlorobenzoyl-N-n-pentyl]-phenyl m-chlorobenzoate | are all H | are $o\text{-}C_6H_4Cl$ | $R^6$ is H, $R^{6'}$ is $C_4H_9$ |
| A28 | 2-[N-isobutyryl-N-phenylethyl]-phenyl isobutyrate | are all H | are $C_3H_7$ | $R^6$ is H, $R^{6'}$ is $C_6H_5CH_2$ |
| A29 | 2-[N-benzoyl-N-benzyl]-4-methyl-phenyl benzoate | $R^3$ is $CH_3$, the rest are all H | are $C_6H_5$ | $R^6$ is H, $R^{6'}$ is $C_6H_5$ |
| A30 | 2-(1-Naphthoyl-N-benzyl)-4-methyl-(1-naphthoic acid) phenyl ester | $R^3$ is $CH_3$, the rest are all H | are $C_{12}H_7$ | $R^6$ is H, $R^{6'}$ is $C_6H_5$ |
| A31 | 2-(octyloxycarbonyl-N-isopropyl)-4-methyl-phenyl octanoate | $R^3$ is $CH_3$, the rest are all H | are $C_7H_{15}O$ | are both $CH_3$, |
| A32 | 2-[N-benzoyl-N-isopropyl]-4-methyl-phenyl benzoate | $R^3$ is $CH_3$, the rest are all H | are $C_6H_5$ | are both $CH_3$ |
| A33 | 2-[1-naphthoyl-N-phenylethyl]-4-methyl-(1-naphthoic acid) phenyl ester | $R^3$ is $CH_3$, the rest are all H | are $C_{12}H_7$ | $R^6$ is H, $R^{6'}$ is $C_6H_5CH_2$ |
| A34 | 2-[1-naphthoyl-N-n-decyl]-4-methyl-(1-naphthoic acid)phenyl ester | $R^3$ is $CH_3$, the rest are all H | are $C_{12}H_7$ | $R^6$ is H, $R^{6'}$ is $C_9H_{19}$ |
| A35 | 2-[N-benzoyl-N-benzyl]-4-ethyl-phenyl benzoate | $R^3$ is $C_2H_5$, the rest are all H | are $C_6H_5$ | $R^6$ is H, $R^{6'}$ is $C_6H_5$ |
| A36 | 2-[N-benzoyl-N-diphenylmethyl]-4-tert-butyl-phenyl benzoate | $R^3$ is $^tC4H9$, the rest are all H | are $C_6H_5$ | are both $C_6H_5$ |
| A37 | 2-(1-naphthoyl-N-benzyl)-4-tert-butyl-(1-naphthoic acid)phenyl ester | $R^3$ is $^tC_4H_9$, the rest are all H | are $C_{12}H_7$ | $R^6$ is H, $R^{6'}$ is $C_6H_5$ |
| A38 | 2-[N-n-decanoyl-N-n-propyl]-4-tert-butyl-phenyl n-decanoate | $R^3$ is $^tC_4H_9$, the rest are all H | are $C_9H_{19}$ | $R^6$ is H, $R^{6'}$ is $C_2H_5$ |
| A39 | 2-[N-cyclohexanecarbonyl-N-p-methoxybenzyl]-4-tert-butyl-phenyl cyclohexanecarboxylate | $R^3$ is $^tC_4H_9$, the rest are all H | are $C_6H_{11}$ | $R^6$ is H, $R^{6'}$ is $p\text{-}C_6H_4OCH_3$ |
| A40 | 2-[N-m-chlorobenzoyl-N-m-chlorobenzyl]-4-tert-butyl-phenyl m-chlorobenzoate | $R^3$ is $^tC_4H_9$, the rest are all H | are $o\text{-}C_6H_4Cl$ | $R^6$ is H, $R^{6'}$ is $o\text{-}C_6H_4Cl$ |
| A41 | 2-[N-phenoxycarbonyl-N-benzyl]-4-tert-butyl-phenyl phenoxycarboxylate | $R^3$ is $^tC_4H_9$, the rest are all H | are $OC_6H_5$ | $R^6$ is H, $R^{6'}$ is $C_6H_5$ |

TABLE 3-continued

| Example No. | Name of internal electron donor a | General formula (III) structure | | |
|---|---|---|---|---|
| | | $R^1, R^2, R^3, R^4$ | $R^5\text{-}R^{5'}$ | $R^6\text{-}R^{6'}$ |
| A42 | 2-[N-p-trifluoromethylbenzoyl-N-benzyl]-4-tert-butyl-phenyl p-trifluoromethylbenzoate | $R^3$ is $^tC_4H_9$, the rest are all H | are $C_6H_5CF_3$ | $R^6$ is H, $R^{6'}$ is $C_6H_5$ |
| A43 | 2-[N-furoyl-N-benzyl]-4-tert-butyl-phenyl furancarboxylate | $R^3$ is $^tC_4H_9$, the rest are all H | are $C_5H_3O$ | $R^6$ is H, $R^{6'}$ is $C_6H_5$ |
| A44 | 2-[N-ethoxycarbonyl-N-diphenylmethyl]-4-methyl-6-methyl-phenyl n-butoxycarboxylate | $R^1$, $R^3$ is $CH_3$, the rest is all H | are $OC_2H_5$ | are both $C_6H_5$ |
| A45 | 2-[N-benzoyl-N-benzyl]-4-chloro-phenyl benzoate | $R^3$ is Cl, the rest are all H | are $C_6H_5$ | $R^6$ is H, $R^{6'}$ is $C_6H_5$ |
| A46 | 1-[N-benzoyl-N-benzyl]-2-naphthyl benzoate | $R^1$, $R^2$ is H, $R^3$ and $R^4$ are connected to a benzene ring | are $C_6H_5$ | $R^6$ is H, $R^{6'}$ is $C_6H_5$ |
| A50 | 2-(ethoxycalbonyl-N-n-hexyl)-4-methyl-phenyl octanoate | $R^3$ is $CH_3$, the rest are all H | are OC2H5 | $R^6$ is H, $R^{6'}$ is C5H11 |
| A51 | 2-[N-benzoyl-N-diphenylmethyl]-4-methyl-6-methyl-phenyl benzoate | $R^1$, $R^3$ is $CH_3$, the rest are all H | are $C_6H_5$ | are both $C_6H_5$ |

Polymerization 1

The polymerization evaluation was carried out using a solid catalyst as a catalyst component for olefin polymerization:

To a 5 L of fully nitrogen-purged stainless steel reactor were added 5 mL of 0.5 mol/L solution of triethylaluminum in hexane and 1 mL of 0.1 mol/L solution of methylcyclohexyldimethoxysilane (CMMS) in hexane and 10 mg of prepared catalyst, then 10 mL of hexane was added to rinse the feed line, and then 2 L (standard state) of hydrogen and 2.5 L of refined propylene were added. The reaction was controlled to prepolymerize at 20° C. for 5 minutes, and the polymerization was carried out at this temperature for 1 hour after the temperature was raised to 70° C. After completion of the reaction, the reactor was cooled and the stirring was stopped, and then the reaction product was discharged and dried to give a polymer.

Preparation of Solid Catalyst Component

Preparation of the catalysts in Examples was carried out under high purity nitrogen. Specific examples were provided as follows.

EXAMPLE 1

To a 500 ml of fully nitrogen-purged five-necked flask equipped with a stirrer were added 10 g diethoxy magnesium and 80 mL toluene to prepare a suspension, and then 20 mL titanium tetrachloride was added dropwise at –10° C., after completion of the addition, the system was slowly warmed to 10° C. after 60 mL titanium tetrachloride was added dropwise, then slowly warmed to 90° C. and then, 3.5 g 2-benzamide-phenyl benzoate was added, and then the system continued to be warmed up to 120° C. and maintained the temperature constant for 2 hours, then the liquid was cleaned by filter pressing and filtered, the resulting solid was washed 3 times with 120 mL titanium tetrachloride at 125° C. The resulting solid was washed two times at 60° C. and two times at room temperature with 150 mL hexane, after filtering to remove the liquid and drying the solid, a solid powder was obtained, i.e. solid catalyst component. The titanium content of the solid catalyst component, internal electron donor content and polymerization data are shown in Table 4.

EXAMPLES 2-49

The solid catalyst component was prepared as in Example 1, except that the 2-benzamide-phenyl benzoate was replaced in the order of the compounds in Tables 1 to 3, respectively.

EXAMPLE 50

To a 500 ml of fully nitrogen-purged five-necked flask equipped with a stirrer were added 10 g of $MgCl_2 \cdot 3C_2H_5OH$ microspheres and 150 mL titanium tetrachloride at –15° C. to prepare a suspension, and then the system was kept at –15° C. for 1 hour and warmed to 80° C., 3 g 2-[N-benzoyl-N-benzyl]-4-tert-butyl-phenyl benzoate was added, and then the system continued to be warmed up to 110° C. and maintained the temperature constant for 1 hour, then the liquid was cleaned by filter pressing and filtered, the resulting solid was washed 3 times with 120 mL titanium tetrachloride at 125° C. The resulting solid was washed four times with 150 mL hexane at 60° C., after filtering to remove the liquid and drying the solid, a solid catalyst component was obtained.

EXAMPLE 51

8 g anhydrous magnesium chloride, 38 mL decane and 35 mL 2-ethylhexanol were reacted at 130° C. for 2 hours to form a homogeneous solution. 1.7 g phthalic anhydride was added to the solution, and stirred for 1 hour at 130° C. to completely dissolve phthalic anhydride in the homogeneous solution. The resulting homogeneous solution was cooled to room temperature and was dropwise added to 200 mL titanium tetrachloride kept at –20° C. over 1 hour; After addition was completed, the mixed solution was heated to 110° C. over 4 hours, when the temperature reached 110° C., 3 g 2-[N-benzoyl-N-benzyl]-4-tert-butyl-phenyl benzoate was added, the mixture was stirred at that temperature for 2 hours. After reaction, the solid portion was collected by hot filtration. The solid portion was suspended in 275 mL titanium tetrachloride and reacted at 110° C. for 2 hours. After the reaction, the solid was collected by hot filtration, sufficiently washed with decane and hexane at 110° C., followed by suction filtration to give a solid catalyst component.

EXAMPLE 52

To a 500 ml fully nitrogen-purged five-necked flask equipped with a stirrer were added 10 g anhydrous magnesium chloride, 150 mL toluene, 17 mL epichlorohydrin and 16 mL tributyl phosphate at the room temperature, warmed to 50° C. with stirring and maintained for 2 hours until the solid was completely dissolved, and then 2.40 g phthalic anhydride was added, the reaction was maintained for 1 hour. The solution was cooled to −25° C., 110 mL titanium tetrachloride was dropwise added over a period of 1 hour, the temperature was slowly raised to 80° C., in the heating process, the solid was precipitated stepwise. 3 g 2-[N-benzoyl-N-benzyl]-4-tert-butyl-phenyl benzoate was added and the reaction was maintained at 80° C. for 1 hour. The resulting sold after filtration was washed twice with 200 mL toluene, and then 120 mL toluene and 80 mL titanium tetrachloride were added, the temperature was raised to 110° C. and maintained for 2 hours, then the liquid was cleaned by filter pressing, and the treatment was repeated one time. The resulting solid after filtration was washed one time with 100 mL dichloroethane, four times with hexane, and dried to give a solid catalyst component.

COMPARATIVE EXAMPLE 1

The solid catalyst component was prepared as in Example 1, except that 2-benzamide-phenyl benzoate was replaced with di-n-butyl phthalate.

COMPARATIVE EXAMPLE 2

The solid catalyst component was prepared as in Example 47 except that 2-[N-benzoyl-N-benzyl]-4-tert-butyl-phenyl benzoate was replaced with di-n-butyl phthalate.

COMPARATIVE EXAMPLE 3

The solid catalyst component was prepared as in Example 48 except that 2-[N-benzoyl-N-benzyl]-4-tert-butyl-phenyl benzoate was replaced with di-n-butyl phthalate.

COMPARATIVE EXAMPLE 4

The solid catalyst component was prepared as in Example 49 except that 2-[N-benzoyl-N-benzyl]-4-tert-butyl-phenyl benzoate was replaced with di-n-butyl phthalate.

TABLE 4

| Example No. | Internal electron donor Type | Wt % | Titanium Wt % | Activity Kg/gCat · h$^{-1}$ | Isotacticity % | MWD |
|---|---|---|---|---|---|---|
| Comparative Example 1 | DNBP | 13.42 | 2.75 | 45.8 | 98.2 | 5.0 |
| Comparative Example 2 | DNBP | 16.54 | 2.42 | 50.3 | 98.0 | 4.6 |
| Comparative Example 3 | DNBP | 12.11 | 2.39 | 44.7 | 97.9 | 4.7 |
| Comparative Example 4 | DNBP | 15.37 | 4.85 | 42.5 | 98.4 | 4.9 |
| 1 | A1 | 11.36 | 3.85 | 47.0 | 98.0 | 6.8 |
| 2 | A2 | 7.18 | 3.66 | 49.2 | 97.9 | 6.9 |
| 3 | A3 | 14.60 | 4.01 | 45.9 | 98.3 | 6.4 |
| 4 | A4 | 14.72 | 3.66 | 50.0 | 98.2 | 6.2 |
| 5 | A5 | 7.37 | 3.84 | 48.2 | 97.8 | 7.0 |
| 6 | A6 | 7.21 | 3.81 | 49.7 | 98.0 | 6.9 |
| 7 | A7 | 17.35 | 3.58 | 45.7 | 98.4 | 6.3 |
| 8 | A8 | 9.74 | 4.56 | 48.8 | 98.2 | 6.7 |
| 9 | A9 | 10.92 | 4.08 | 51.1 | 98.0 | 6.5 |
| 10 | A10 | 12.01 | 3.29 | 48.7 | 97.7 | 6.4 |
| 11 | A11 | 14.39 | 4.22 | 47.9 | 97.5 | 6.7 |
| 12 | A12 | 9.28 | 3.16 | 52.5 | 97.9 | 6.8 |
| 13 | A13 | 14.37 | 3.2 | 55.1 | 98.0 | 7.0 |
| 14 | A14 | 9.63 | 3.3 | 50.2 | 98.2 | 7.1 |
| 15 | A15 | 12.45 | 2.09 | 49.4 | 98.2 | 7.4 |
| 16 | A16 | 12.69 | 3.04 | 48.3 | 98.5 | 7.6 |
| 17 | A17 | 12.70 | 3.07 | 50.9 | 98.4 | 7.3 |
| 18 | A18 | 8.06 | 4.06 | 53.1 | 98.3 | 7.8 |
| 19 | A19 | 13.47 | 3.86 | 47.9 | 98.0 | 7.5 |
| 20 | A20 | 13.31 | 3.38 | 48.8 | 97.6 | 7.7 |
| 21 | A21 | 9.26 | 3.01 | 51.1 | 97.9 | 7.4 |
| 22 | A22 | 11.16 | 3.67 | 51.7 | 98.1 | 7.8 |
| 23 | A23 | 10.25 | 3.3 | 52.4 | 97.6 | 7.5 |
| 24 | A24 | 6.61 | 4.27 | 55.5 | 97.8 | 7.9 |
| 25 | A25 | 11.31 | 3.18 | 48.8 | 98.0 | 7.6 |
| 26 | A26 | 8.12 | 3.04 | 46.2 | 98.0 | 7.0 |
| 27 | A27 | 7.68 | 4.07 | 49.3 | 98.1 | 7.3 |
| 28 | A28 | 11.74 | 3.18 | 50.5 | 97.7 | 7.2 |
| 29 | A29 | 9.65 | 4.33 | 58.4 | 97.9 | 8.0 |
| 30 | A30 | 6.00 | 4.06 | 55.7 | 98.2 | 8.5 |
| 31 | A31 | 5.57 | 4.85 | 52.2 | 98.4 | 8.1 |
| 32 | A32 | 7.19 | 3.66 | 57.9 | 98.1 | 7.9 |
| 33 | A33 | 7.67 | 4.01 | 60.1 | 97.6 | 8.3 |
| 34 | A34 | 7.59 | 3.66 | 63.6 | 98.1 | 7.9 |
| 35 | A35 | 7.70 | 3.84 | 59.4 | 98.3 | 8.2 |
| 36 | A36 | 9.51 | 3.81 | 65.6 | 98.0 | 10.8 |
| 37 | A37 | 12.02 | 3.58 | 60.7 | 97.6 | 10.2 |
| 38 | A38 | 9.59 | 3.56 | 55.8 | 97.9 | 9.2 |

TABLE 4-continued

| Example No. | Internal electron donor Type | Wt % | Titanium Wt % | Activity Kg/gCat · h⁻¹ | Isotacticity % | MWD |
|---|---|---|---|---|---|---|
| 39 | A39 | 7.74 | 4.08 | 58.3 | 98.2 | 9.4 |
| 40 | A40 | 12.7 | 3.29 | 61.2 | 98.2 | 9.4 |
| 41 | A41 | 5.77 | 3.22 | 63.2 | 98.4 | 9.2 |
| 42 | A42 | 14.1 | 3.16 | 58.8 | 98.0 | 9.8 |
| 43 | A43 | 8.10 | 3.2 | 58.3 | 98.1 | 8.8 |
| 44 | A44 | 6.34 | 4.3 | 54.7 | 97.8 | 8.6 |
| 45 | A45 | 7.16 | 3.09 | 55.0 | 97.8 | 9.3 |
| 46 | A46 | 6.47 | 4.04 | 61.5 | 98.0 | 10.2 |
| 47 | A47 | 9.20 | 3.17 | 63.1 | 98.1 | 8.9 |
| 48 | A48 | 8.32 | 3.55 | 65.2 | 98.0 | 9.3 |
| 49 | A49 | 8.54 | 3.38 | 60.7 | 98.2 | 8.8 |
| 50 | A36 | 15.48 | 3.07 | 60.6 | 97.9 | 8.9 |
| 51 | A36 | 14.26 | 3.06 | 53.7 | 97.8 | 9.2 |
| 52 | A36 | 7.07 | 3.86 | 54.0 | 98.4 | 9.3 |

DNBP is Di-n-Butyl Phthalate

The polymerization results in Table 4 show that the catalyst obtained by using a compound selected from the group consisting of a 2-substituted amino-phenyl ester compounds as an internal electron donor and four different catalyst preparation processes has excellent activity for olefin polymerization. Under the same preparation process, most of the catalysts using 2-substituted amino-phenyl ester compounds as internal electron donors have higher activity than that using phthalate esters, and the molecular weight distribution (MWD) of the obtained polypropylenes is significantly wider than that using phthalate catalysts. Due to the difference in molecular weight distribution caused by the different substituents and functional groups in the compound, one or some compounds which meet the specific molecular weight distribution index can be selected as needed to adjust the molecular weight distribution of the polymer product.

COMPARATIVE EXAMPLE 5

The solid catalyst component was prepared as in Example 1, except that 3.5 g of 2-benzamide-phenyl benzoate was replaced with 4 g of 9,9-bismethoxymethylfluorene.

COMPARATIVE EXAMPLE 6

The solid catalyst component was prepared as in Example 1, except that 3.5 g of 2-benzamide-phenyl benzoate was replaced with 4 g of diethyl 2,3-diisopropylsuccinate.

EXAMPLE 53

The solid catalyst component was prepared as in Example 36 except that 3.5 g of 2-[N-benzoyl-N-benzyl]-4-tert-butyl-phenyl benzoate was replaced with 2.5 g 2-[N-benzoyl-N-benzyl]-4-tert-butyl-phenyl benzoate.

EXAMPLE 54

The solid catalyst component was prepared as in Example 36 except that 3.5 g of 2-[N-benzoyl-N-benzyl]-4-tert-butyl-phenyl benzoate was replaced with 4 g 2-[N-benzoyl-N-benzyl]-4-tert-butyl-phenyl benzoate.

EXAMPLE 55

The solid catalyst component was prepared as in Example 36 except that 3.5 g of 2-[N-benzoyl-N-benzyl]-4-tert-butyl-phenyl benzoate was replaced with 5 g 2-[N-benzoyl-N-benzyl]-4-tert-butyl-phenyl benzoate.

TABLE 5

| Example No. | Internal electron donor Wt % | Titanium Wt % | Activity Kg/gCat · h⁻¹ | Isotacticity % | MWD |
|---|---|---|---|---|---|
| Comparative Example 5 | 12.27 | 4.10 | 60.3 | 98.1 | 4.4 |
| Comparative Example 6 | 9.29 | 4.25 | 41.1 | 97.5 | 11.4 |
| Example 53 | 7.44 | 3.97 | 58.5 | 97.8 | 9.7 |
| Example 36 | 9.51 | 3.81 | 65.6 | 98.0 | 10.8 |
| Example 54 | 10.20 | 4.23 | 66.3 | 98.3 | 11.7 |
| Example 55 | 11.92 | 4.50 | 60.7 | 98.2 | 12.6 |

The polymerization results in Table 5 show that the catalyst prepared by using the 2-substituted amino-phenyl ester compound as the internal electron donor has high activity, and the molecular weight distribution of the obtained polymer is significantly wider than that with use of 9,9-indenedimethoxymethylfluorene (a representative compound in 1,3-diether electron donors), up to about 3 times. When the content of 2-[N-benzoyl-N-benzyl]-4-tert-butyl-phenyl benzoate in the catalyst component increases, the molecular weight distribution of the obtained polypropylene tends to gradually broaden, indicating that the molecular weight distribution of the polymer can be adjusted by adjusting the content of the 2-substituted amino-phenyl ester compound in the catalyst component. When the content of 2-[N-benzoyl-N-benzyl]-4-tert-butyl-phenyl benzoate is higher, the obtained polymer can have a wider molecular weight distribution and higher activity than those obtained by using 2,3-diisopropylsuccinic acid (a representative compound in succinate electron donors, characterized by producing a polymer with a broad molecular weight distribution).

EXAMPLE 56

In 500 ml of a fully nitrogen-purged 5-neck flask equipped with a stirrer, 10 g of diethoxymagnesium and 80 mL of toluene were added to prepare a suspension, and then 20 mL of titanium tetrachloride was added dropwise at −10° C.; after the addition was completed, the system was slowly heated to 10° C. and 60 mL of titanium tetrachloride was added dropwise therein, then the system was slowly warmed to 90° C., and 3 g of 2-benzamide-phenyl benzoate and 1 g of 9,9-bismethoxymethylfluorene were added. Thereafter, the temperature was further raised to 120° C. and maintained for 2 hours, then the liquid was removed by vacuum filtration. The obtained solid was washed three times with 120 mL of titanium tetrachloride at 125° C., washed twice with 150 mL of hexane at 60° C., and washed twice at room temperature. After filtering off the liquid and drying, a solid powder was obtained as a solid catalyst component. The titanium content of the solid catalyst component, internal electron donor content and polymerization data are shown in Table 6.

EXAMPLES 57-63

The solid catalyst component was prepared in the same manner as in Example 56 except that the 2-benzamide-phenyl benzoate was replaced with the compounds A1, A4, A47, A52, A13, A22, A30, A50, A36, A51, respectively.

EXAMPLE 64

The solid catalyst component was prepared as in Example 62 except that 9,9-indenedimethoxymethylfluorene was replaced with di-n-butyl phthalate.

EXAMPLE 65

The solid catalyst component was prepared as in Example 62 except that 9,9-indenedimethoxymethylfluorene was replaced with diethyl 2-isopropyl-2-isopentyl-malonate.

EXAMPLE 66

The solid catalyst component was prepared as in Example 62 except that 9,9-indenedimethoxymethylfluorene was replaced with diethyl 2,3-diisopropylsuccinate.

EXAMPLE 67

The solid catalyst component was prepared as in Example 62 except that 9,9-indenedimethoxymethylfluorene was replaced with 2,4-pentanediol dibenzoate.

EXAMPLE 68

The solid catalyst component was prepared as in Example 62 except that 3 g of 2-[N-benzoyl-N-benzyl]-4-tert-butyl-phenyl benzoate and 1 g of 9,9-dimethoxymethylfluorenein-dene were replaced with 3 g of 2-[N-benzoyl-N-benzyl]-4-tert-butyl-phenyl benzoate and 1.5 g of 9,9-indenedimethoxymethylfluorene.

EXAMPLE 69

The solid catalyst component was prepared as in Example 62 except that 3 g of 2-[N-benzoyl-N-benzyl]-4-tert-butyl-phenyl benzoate and 1 g of 9,9-dimethoxymethylfluorenein-dene were replaced with 1.5 g of 2-[N-benzoyl-N-benzyl]-4-tert-butyl-phenyl benzoate and 1.5 g of 9,9-indenedimethoxymethylfluorene.

EXAMPLE 70

The solid catalyst component was prepared as in Example 62 except that 3 g of 2-[N-benzoyl-N-benzyl]-4-tert-butyl-phenyl benzoate and 1 g of 9,9-dimethoxymethylfluorene were replaced with indene 2 g of 2-[N-benzoyl-N-benzyl]-4-tert-butyl-phenyl benzoate and 1.5 g of 9,9-indenedimethoxymethylfluorene.

EXAMPLE 71

The solid catalyst component was prepared as in Example 62 except that 3 g of 2-[N-benzoyl-N-benzyl]-4-tert-butyl-phenyl benzoate and 1 g of 9,9-dimethoxymethylfluorene were replaced with indene 3 g of 2-[N-benzoyl-N-benzyl]-4-tert-butyl-phenyl benzoate and 0.5 g of 9,9-indenedimethoxymethylfluorene.

EXAMPLE 72

The solid catalyst component was prepared as in Example 7, except that 3 g of 2-[N-benzoyl-N-benzyl]-4-tert-butyl-phenyl benzoate and 1 g of 9,9-dimethoxymethylfluorene were replaced with indene 2 g of 2-[N-benzoyl-N-benzyl]-4-tert-butyl-phenyl benzoate and 2 g of 9,9-indenedimethoxymethylfluorene.

EXAMPLE 73

The solid catalyst component was prepared as in Example 56 except that 2-benzamide-phenyl benzoate was replaced with 2-[N-benzoyl-N-tert-butyl]-phenyl benzoate.

EXAMPLE 74

The solid catalyst component was prepared as in Example 56 except that 2-benzamide-phenyl benzoate was replaced with 2-[N-benzoyl-N-phenyl]-4-tert-butyl-phenyl benzoate.

EXAMPLE 75

The suspension was prepared by adding 10 g of $MgCl_2.3C_2H_5OH$ microspheres and 150 mL of titanium tetrachloride at −15° C. in a fully nitrogen-purged 5-neck flask equipped with a stirrer, and then maintained at −15° C. for 1 hour. After the temperature was slowly warmed to 80° C., 3 g of 2-[N-benzoyl-N-diphenylmethyl]-4-tert-butyl-phenyl benzoate and 1 g of 9,9-indenedimethoxymethylfluorene were added, then the temperature was further warmed to 110° C. and maintained for 1 hour. Thereafter, the liquid was removed by vacuum filtration, and the resulting solid was washed three times with 120 mL of titanium tetrachloride at 125° C., and washed 4 times with 150 mL of hexane at 60° C. A solid catalyst component was obtained after filtering off the liquid and drying.

EXAMPLE 76

8 g of anhydrous magnesium chloride, 38 mL of decane and 35 mL of 2-ethylhexanol were allowed to react at 130° C. for 2 hours to form a homogeneous solution. To the solution was added 1.7 g of phthalic anhydride, and the mixture was stirred at 130° C. for 1 hour to completely dissolve the phthalic anhydride in the homogeneous solution. The obtained homogeneous solution was cooled to room temperature, and added dropwise to 200 mL of titanium tetrachloride kept at −20° C. in 1 hour; after the addition, the mixed solution was heated to 110° C. in 4 hours and 3 g of 2-[N-benzoyl-N-diphenylmethyl]-4-tert-butyl-phenyl benzoate and 1 g of 9,9-indenedimethoxymethylfluorene were added, the mixture was stirred at the above temperature for 2 hours. After reacting for 2 hours, the solid portion was collected by hot filtration. The solid portion was suspended in 275 mL of titanium tetrachloride followed by reacting at 110° C. for 2 hours. After the reaction, the solid portion was collected by hot filtration, thoroughly washed with decane and hexane at 110° C., and vacuum filtered to give a solid catalyst component.

EXAMPLE 77

To 500 ml of a fully nitrogen-purged 5-necked flask equipped with a stirrer were added 10 g of anhydrous magnesium chloride, 150 mL of toluene, 17 mL of epichlorohydrin and 16 mL of tributyl phosphate at room temperature, and the temperature was raised to 50° C. with stirring and maintained for 2 hours until the solid was completely dissolved, 2.40 g of phthalic anhydride was added to the system to react for 1 hour. The solution was cooled to −25° C., 110 mL of titanium tetrachloride was added dropwise in 1 hour, and the temperature was slowly raised to 80° C., and the solid was gradually precipitated during the temperature rise. After addition of 3 g of 2-[N-benzoyl-N-diphenylmethyl]-4-tert-butyl-phenyl benzoate and 1 g of 9,9-indenedimethoxymethylfluorene, the system was maintained at 80° C. for 1 hour. After filtration, the obtained solid was washed twice with 200 mL of toluene, then 120 mL of toluene and 80 mL of titanium tetrachloride were added, and the temperature was further raised to 110° C. and maintained for 2 hours, and then the liquid was removed by vacuum filtration and the treatment was repeated once more. After the liquid was filtered off, the obtained solid was washed once with 100 mL of dichloroethane, and then washed four times with hexane to afford a solid catalyst component.

EXAMPLE 78

The solid catalyst component was prepared as in Example 75 except that 9,9-indenedimethoxymethylfluorene was replaced with 2,4-pentanediol dibenzoate.

EXAMPLE 79

The solid catalyst component was prepared as in Example 76 except that 9,9-indenedimethoxymethylfluorene was replaced with 2,4-pentanediol dibenzoate.

EXAMPLE 80

The solid catalyst component was prepared as in Example 77 except that 9,9-indenedimethoxymethylfluorene was replaced with 2,4-pentanediol dibenzoate.

EXAMPLE 81

The solid catalyst component was prepared as in Example 75 except that 9,9-indenedimethoxymethylfluorene was replaced with diethyl 2,3-diisopropylsuccinate.

EXAMPLE 82

The solid catalyst component was prepared as in Example 76 except that 9,9-indenedimethoxymethylfluorene was replaced with diethyl 2,3-diisopropylsuccinate.

EXAMPLE 83

The solid catalyst component was prepared as in Example 77 except that 9,9-indenedimethoxymethylfluorene was replaced with diethyl 2,3-diisopropylsuccinate.

COMPARATIVE EXAMPLE 7

The solid catalyst component was prepared as in Example 56 except that 3 g of 2-benzamide-phenyl benzoate and 1 g of 9,9-indenedimethoxymethylfluorene were replaced with 4 g of 2-benzamide-phenyl benzoate.

COMPARATIVE EXAMPLE 8

The solid catalyst component was prepared as in Example 56 except that 3 g of 2-benzamide-phenyl benzoate and 1 g of 9,9-indenedimethoxymethylfluorene were replaced with 4 g of 2-benzamide 4-tert-butyl-phenyl benzoate.

COMPARATIVE EXAMPLE 9

The solid catalyst component was prepared as in Example 56 except that 3 g of 2-benzamide-phenyl benzoate and 1 g of 9,9-indenedimethoxymethylfluorene were replaced with 4 g of 2-benzylimine-phenyl benzoate.

COMPARATIVE EXAMPLE 10

The solid catalyst component was prepared as in Example 56 except that 3 g of 2-benzamide-phenyl benzoate and 1 g of 9,9-indenedimethoxymethylfluorene were replaced with 4 g of 2-benzylimine-4-methyl-phenyl benzoate.

COMPARATIVE EXAMPLE 11

The solid catalyst component was prepared as in Example 56 except that 3 g of 2-benzamide-phenyl benzoate and 1 g of 9,9-indenedimethoxymethylfluorene were replaced with 4 g of 2-(1-naphthalenecarboxamide-N-benzyl)-4-methyl-(1-naphthoic acid)phenyl ester.

COMPARATIVE EXAMPLE 12

The solid catalyst component was prepared as in Example 56 except that 3 g of 2-benzamide-phenyl benzoate and 1 g of 9,9-indenedimethoxymethylfluorene were replaced by 4 g of 2-(octylamide-N-hexyl)-4-methyl-phenyl octanoate.

COMPARATIVE EXAMPLE 13

The solid catalyst component was prepared as in Example 56 except that 3 g of 2-benzamide-phenyl benzoate and 1 g of 9,9-indenedimethoxymethylfluorene were replaced with 4 g of 2-[N-benzamide-N-benzyl]-4-tert-butyl-phenyl benzoate.

COMPARATIVE EXAMPLE 14

The solid catalyst component was prepared as in Example 56 except that 3 g of 2-benzamide-phenyl benzoate and 1 g of 9,9-indenedimethoxymethylfluorene were replaced with 4 g of 2-[N-benzamide-N-benzyl]-4-methyl-6-methyl-phenyl benzoate.

COMPARATIVE EXAMPLE 15

The solid catalyst component was prepared as in Example 56 except that 3 g of 2-benzamide-phenyl benzoate and 1 g of 9,9-indenedimethoxymethylfluorene were replaced with 4 g of di-n-butyl phthalate.

COMPARATIVE EXAMPLE 16

The solid catalyst component was prepared as in Example 56 except that 3 g of 2-benzamide-phenyl benzoate and 1 g of 9,9-indenedimethoxymethylfluorene were replaced with 4 g of 9,9-methoxymethylfluorene.

COMPARATIVE EXAMPLE 17

The solid catalyst component was prepared as in Example 56 except that 3 g of 2-benzamide-phenyl benzoate and 1 g of 9,9-indenedimethoxymethylfluorene were replaced with 4 g of 2-isopropyl-2-pentylisopentyl-ethyl malonate.

COMPARATIVE EXAMPLE 18

The solid catalyst component was prepared as in Example 56 except that 3 g of 2-benzamide-phenyl benzoate and 1 g of 9,9-indenedimethoxymethylfluorene were replaced with 4 g of 2,3-diisopropyl-diethyl succinate.

COMPARATIVE EXAMPLE 19

The solid catalyst component was prepared as in Example 56 except that 3 g of 2-benzamide-phenyl benzoate and 1 g of 9,9-indenedimethoxymethylfluorene were replaced with 4 g of 2,4-pentanediolbenzoate.

TABLE 6

| Example No. | Catalyst No. | Type A | A (wt) % | Type B | B (wt) % | Titanium Wt % | Activity Kg/gCat·h$^{-1}$ | Iso-tacticity % | MWD |
|---|---|---|---|---|---|---|---|---|---|
| Comparative Example 7 | REF-1 | A1 | 11.36 | — | — | 3.85 | 47.0 | 98.0 | 6.8 |
| Comparative Example 8 | REF-2 | A4 | 7.18 | — | — | 3.66 | 49.2 | 97.9 | 6.9 |
| Comparative Example 9 | REF-3 | A13 | 14.37 | — | — | 3.20 | 55.1 | 98.0 | 7.0 |
| Comparative Example 10 | REF-4 | A22 | 11.16 | — | — | 3.67 | 51.7 | 98.1 | 7.8 |
| Comparative Example 11 | REF-5 | A30 | 6.0 | — | — | 4.06 | 55.7 | 98.2 | 8.5 |
| Comparative Example 12 | REF-6 | A50 | 5.63 | — | — | 4.62 | 51.9 | 98.3 | 8.4 |
| Comparative Example 13 | REF-7 | A36 | 9.51 | — | — | 3.81 | 65.6 | 98.0 | 10.8 |
| Comparative Example 14 | REF-8 | A51 | 6.34 | — | — | 4.30 | 54.7 | 97.8 | 8.6 |
| Comparative Example 15 | REF-9 | — | — | DNBP | 14.20 | 2.89 | 48.5 | 98.5 | 5.5 |
| Comparative Example 16 | REF-10 | — | — | FLU | 12.27 | 4.10 | 60.3 | 98.1 | 4.4 |
| Comparative Example 17 | REF-11 | — | — | DIE | 11.16 | 3.92 | 55.8 | 98.0 | 4.8 |
| Comparative Example 18 | REF-12 | — | — | SUC | 9.29 | 4.25 | 41.1 | 97.5 | 11.4 |
| Comparative Example 19 | REF-13 | — | — | BRD | 14.03 | 3.20 | 53.4 | 98.2 | 6.0 |
| Example 56 | CAT-1 | A1 | 8.22 | FLU | 3.35 | 3.68 | 67.4 | 97.9 | 5.1 |
| Example 57 | CAT-2 | A4 | 4.96 | FLU | 3.26 | 3.53 | 65.2 | 98.2 | 5.5 |
| Example 58 | CAT-3 | A13 | 9.10 | FLU | 3.51 | 3.36 | 69.3 | 98.0 | 6.0 |
| Example 59 | CAT-4 | A22 | 7.45 | FLU | 3.29 | 3.13 | 77.2 | 98.4 | 6.7 |
| Example 60 | CAT-5 | A30 | 4.94 | FLU | 3.60 | 3.68 | 70.5 | 98.2 | 6.4 |
| Example 61 | CAT-6 | A50 | 4.05 | FLU | 3.18 | 4.12 | 72.0 | 98.6 | 6.9 |
| Example 62 | CAT-7 | A36 | 5.93 | FLU | 3.55 | 3.73 | 83.7 | 98.5 | 7.7 |
| Example 63 | CAT-8 | A51 | 4.57 | FLU | 3.30 | 3.79 | 78.2 | 98.1 | 6.9 |
| Example 64 | CAT-9 | A36 | 6.69 | DNBP | 4.21 | 3.54 | 53.5 | 98.8 | 7.4 |
| Example 65 | CAT-10 | A36 | 6.10 | DIE | 3.66 | 3.49 | 68.3 | 98.2 | 7.1 |
| Example 66 | CAT-11 | A36 | 6.41 | SUC | 2.30 | 3.43 | 59.2 | 98.0 | 12.3 |
| Example 67 | CAT-12 | A36 | 5.92 | BRD | 3.71 | 3.59 | 65.8 | 99.0 | 8.9 |
| Example 68 | CAT-13 | A36 | 6.19 | FLU | 4.85 | 3.73 | 89.8 | 98.3 | 7.0 |
| Example 69 | CAT-14 | A36 | 4.07 | FLU | 4.34 | 3.71 | 2.83.5 | 98.1 | 6.7 |
| Example 70 | CAT-15 | A36 | 5.22 | FLU | 4.90 | 3.24 | 87.0 | 97.9 | 6.9 |
| Example 71 | CAT-16 | A36 | 6.37 | FLU | 1.67 | 3.96 | 70.3 | 98.4 | 8.2 |
| Example 72 | CAT-17 | A36 | 5.43 | FLU | 6.22 | 3.70 | 93.2 | 98.3 | 6.3 |
| Example 73 | CAT-18 | A47 | 6.11 | FLU | 3.54 | 4.01 | 87.5 | 98.2 | 6.8 |
| Example 74 | CAT-19 | A52 | 5.93 | FLU | 3.28 | 3.82 | 89.3 | 98.4 | 6.5 |
| Example 75 | CAT-20 | A36 | 5.68 | FLU | 3.49 | 2.85 | 88.6 | 98.4 | 7.5 |
| Example 76 | CAT-21 | A36 | 6.02 | FLU | 3.12 | 2.48 | 72.9 | 98.0 | 7.8 |
| Example 77 | CAT-22 | A36 | 5.84 | FLU | 3.37 | 3.01 | 82.5 | 98.2 | 7.6 |
| Example 78 | CAT-23 | A36 | 6.32 | BRD | 3.26 | 2.93 | 69.2 | 98.8 | 8.8 |
| Example 79 | CAT-24 | A36 | 6.19 | BRD | 3.11 | 2.55 | 58.0 | 98.6 | 8.8 |
| Example 80 | CAT-25 | A36 | 5.86 | BRD | 3.03 | 3.42 | 62.7 | 98.8 | 8.7 |
| Example 81 | CAT-26 | A36 | 6.32 | SUC | 2.56 | 2.78 | 64.7 | 98.2 | 12.0 |
| Example 82 | CAT-27 | A36 | 6.29 | SUC | 2.70 | 2.25 | 52.1 | 98.3 | 12.3 |
| Example 83 | CAT-28 | A36 | 6.17 | SUC | 3.01 | 3.22 | 55.8 | 98.1 | 12.4 |

DNBP: Di-n-butyl phthalate, FLU: 9,9-methoxymethylindenefluorene
DIE: ethyl 2-isopropyl-2-isopentyl-malonate, SUC: diethyl 2,3-diisopropylsuccinate
BRD: 2,4-pentanediol dibenzoate, "—" means that the item is not present.

As can be seen from the data in Table 6, when 8 kinds of 2-substituted amino-phenyl ester compounds and 9,9-indenedimethoxymethylfluorene are compounded as internal electron donors for catalyst components, respectively (Examples 56-63, Examples 68-74), the activity of the catalyst is significantly higher than that with use of the 2-substituted amino-phenyl ester compound alone (Comparative Examples 7-14) or 9,9-indenedimethoxymethylfluorene alone (Comparative Example 16) as internal electron donor. The molecular weight distribution of the obtained polymer is between the 2-substituted amino-phenyl ester compound and 9,9-indenedimethoxymethylfluorene. When other conditions are fixed only except that the ratio of the 2-substituted amino-phenyl ester compound and the 9,9-indenedimethoxymethylfluorene compound are different (Examples 62, 68 to 72), the activity of the catalyst and the molecular weight distribution of the obtained polymer are significantly different, up to 93.2 KgPP/gCat, and the polymer has a moderate molecular weight distribution.

When a 2-substituted amino-phenyl ester compound and a succinic acid ester are compounded (Example 66), the obtained polymer has a wider molecular weight distribution than that with use of a 2-substituted amino-phenyl ester compound (Comparative Example 13) and a succinic acid ester (Comparative Example 18).

When a 2-substituted amino-phenyl ester compound and di-n-butyl phthalate are compounded (Example 64), the isotacticity of the obtained polymer is further improved compared to use of a 2-substituted amino-phenyl ester compound (Comparative Example 7) or di-n-butyl phthalate (Comparative Example 15) alone. When the 2-substituted amino-phenyl ester compound and the diol ester compound are compounded (Example 67), the polymer isotacticity is improved (compared to Comparative Example 13 and 19).

Polymerization Condition 2

The polymerization evaluation was carried out by using a solid catalyst as a catalyst component for olefin polymerization under the following conditions:

After a 5 L stainless steel reactor was sufficiently purged with nitrogen, a solution of 0.5 mol/L of triethylaluminum hexane (the amount of triethylaluminum is shown in Table 6 for Al/Ti) and the prepared 3-5 mg of catalyst were added. Then, 10 mL of hexane was added to rinse the feed line followed by 2 L (standard state) of hydrogen and 2.5 L of refined propylene were added. The reaction was controlled to prepolymerize at 20° C. for 5 minutes, and the temperature was raised to 70° C. At this temperature, the polymerization reaction went on for corresponding time (see Table 7). After completion of the reaction, the reactor was cooled and the stirring was stopped, and the reaction product was discharged and dried to give a polymer. The results obtained are shown in Table 7.

EXAMPLES 84-89

Polymerization was carried out using Catalyst CAT-13 according to the conditions described in Polymerization Conditions 2 and Table 7, and the polymerization results were shown in Table 7.

EXAMPLES 90-95

Polymerization was carried out using Catalyst CAT-17 according to the conditions described in Polymerization Conditions 2 and Table 7, and the polymerization results were shown in Table 7.

COMPARATIVE EXAMPLE 20

Polymerization was carried out using Catalyst REF-7 according to the conditions described in Polymerization Conditions 2 and Table 7, and the polymerization results were shown in Table 7.

COMPARATIVE EXAMPLES 21-25

Polymerization was carried out using the catalysts REF-9 to REF-13 according to the conditions described in Polymerization Conditions 2 and Table 7, respectively, and the polymerization results were shown in Table 7.

TABLE 7

| No. | Catalyst No. | Al/Ti (mol/mol) | Polymerization time (min) | Polymerization activity (min) | Iso-tacticity % | MWD $M_w/M_n$ | Polymer ash (ppm) |
|---|---|---|---|---|---|---|---|
| Example 84 | CAT-13 | 500 | 60 | 119 | 98.2 | 7.0 | 330 |
| Example 85 | CAT-13 | 500 | 90 | 142 | 98.3 | 6.9 | 289 |
| Example 86 | CAT-13 | 500 | 120 | 166 | 98.1 | 6.9 | 188 |
| Example 87 | CAT-13 | 200 | 60 | 120 | 98.0 | 7.2 | 99 |
| Example 88 | CAT-13 | 100 | 60 | 118 | 98.0 | 7.3 | 45 |
| Example 89 | CAT-13 | 90 | 120 | 161 | 98.1 | 7.1 | 32 |
| Example 90 | CAT-17 | 500 | 60 | 130 | 98.3 | 6.4 | 287 |
| Example 91 | CAT-17 | 500 | 90 | 163 | 98.4 | 6.3 | 243 |
| Example 92 | CAT-17 | 500 | 120 | 192 | 98.2 | 6.3 | 174 |
| Example 93 | CAT-17 | 200 | 60 | 137 | 98.2 | 6.8 | 89 |
| Example 94 | CAT-17 | 100 | 60 | 128 | 98.2 | 6.7 | 37 |
| Example 95 | CAT-17 | 90 | 120 | 201 | 98.0 | 6.7 | 25 |
| Comparative Example 20 | REF-7 | 500 | 60 | 82 | 97.2 | 10.4 | 290 |
| Comparative Example 21 | REF-9 | 500 | 60 | 59 | 97.6 | 5.6 | 377 |
| Comparative Example 22 | REF-10 | 500 | 60 | 94 | 98.0 | 4.5 | 284 |
| Comparative Example 23 | REF-11 | 500 | 60 | 81 | 97.9 | 4.8 | 242 |
| Comparative Example 24 | REF-12 | 500 | 60 | 59 | 96.7 | 11.3 | 343 |
| Comparative Example 25 | REF-13 | 500 | 60 | 69 | 97.3 | 6.2 | 311 |

It can be seen from the data in Table 7 that the catalysts CAT-13 and CAT-17 which are compounded with a 2-substituted amino-phenyl ester compound and 9,9-bis-methoxymethylfluorene using an ethoxy magnesium carrier can obtain ultrahigh activity without use of an external electron donor than that of the non-complexed catalyst under the same polymerization conditions (Comparative Example 20-25), and still maintain a high isotacticity of 98.0% or more. When the polymerization time is extended from 60 minutes to 90 minutes and 120 minutes, the catalyst can maintain ultra high activity without attenuation. The polypropylene obtained with low Al/Ti has a low ash content and can be reduced to a minimum of 25 ppm.

Although the above has described the present invention with the general and specific embodiments in detail, but on the basis of the present invention, it is obvious for those skilled in this art to make some changes or improvements. Therefore, these modifications or improvements made without departing from the spirit of the present invention belong to the scope of the invention as claimed.

INDUSTRIAL APPLICABILITY

The present invention provides a solid catalyst component for olefin polymerization comprising Mg, Ti, a halogen and at least one electron donor, wherein the electron donor is a 2-substituted amino-phenyl ester compound selected from the general formula (I). The invention also discloses a catalyst comprising the solid catalyst component and the use of the catalyst in the olefin polymerization, in particular in the propylene polymerization. The invention provides a solid catalyst component that is suitable for producing a broad molecular weight distribution polymer and has high polymerization activity, and the obtained polymer has high isotacticity, wide and adjustable molecular weight distribution. The catalyst is suitable for producing a polyolefin product having a broad molecular weight distribution. The invention has industrial applicability.

What is claimed is:

1. A solid catalyst component for olefin polymerization, comprising Mg, Ti, a halogen and at least one electron donor, the at least one electron donor comprising a first electron donor A represented by general formula (IV):

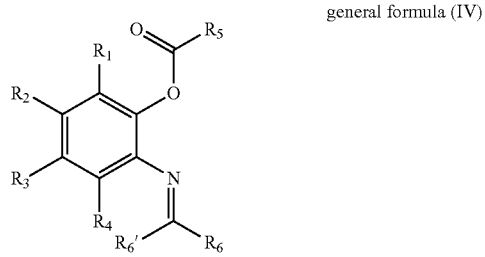

general formula (IV)

wherein $R^1$, $R^2$, $R^3$ and $R^4$ are the same or different and are selected from H, halogen, and a $C_1$-$C_{20}$ hydrocarbon group, wherein two or more of $R^1$, $R^2$, $R^3$ and $R^4$ may be bonded to each other to form a ring; wherein $R^5$ is a $C_1$-$C_{20}$ hydrocarbon group which optionally comprises one or more heteroatoms selected from the group consisting of N, O, S, P, Si and a halogen as a substituent of a carbon atom or a hydrogen atom or both; $R^6$ and $R^{6'}$ are the same or different and are each selected from the group consisting of:

H;
a $C_1$-$C_{20}$ linear or branched alkyl, cycloalkyl, alkenyl, or ester group;
a phenyl;
a $C_7$-$C_{20}$ alkylphenyl;
a $C_7$-$C_{20}$ phenylalky;
and a $C_7$-$C_{20}$ indenyl.

2. The solid catalyst component according to claim 1, wherein the at least one electron donor further includes a second electron donor B selected from a Lewis base compound containing one or more electronegative groups.

3. The solid catalyst component according to claim 2, wherein the molar ratio of the first electron donor A and the second electron donor B is between 0.01 and 100.

4. The solid catalyst component according to claim 2, wherein the second electron donor B is selected from the group consisting of Lewis base containing one or more electronegative groups, and electron donor atoms of the electron donor B are selected from the group consisting of N, O, S, P, As and Sn.

5. The solid catalyst component according to claim 4, wherein the electron donor B is a diether compound selected from the group consisting of 1,3-diethers of the general formula (V):

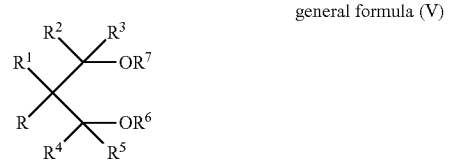

general formula (V)

wherein: R, $R^1$, $R^2$, $R^3$, $R^4$ and $R^5$ may be the same or different and represent H or $C_1$-$C_{18}$ linear or branched alkyl, cycloalkyl, aryl, alkylaryl or aralkyl, $R^6$ and $R^7$ may be the same or different and represent a straight or branched $C_1$-$C_{20}$ alkyl, $C_3$-$C_{20}$ cycloalkyl, $C_5$-$C_{20}$ aryl, $C_7$-$C_{20}$ alkaryl and $C_7$-$C_{20}$ aralkyl; one or more of R to $R^7$ may be bonded to form a cyclic structure, each of which may comprise one or more heteroatoms selected from the group consisting of halogen, N, O, S, P and Si.

6. The solid catalyst component according to claim 4, wherein the electron donor B is an ester compound which is a monocarboxylate or a polycarboxylate compound.

7. The solid catalyst component according to claim 6, wherein the ester compound is selected from the group consisting of succinate compounds of the general formula (VI):

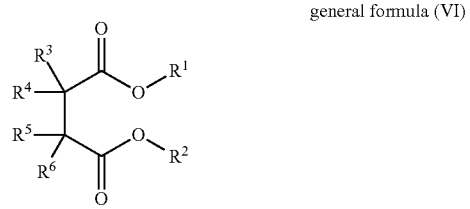

general formula (VI)

wherein the groups $R^1$ and $R^2$ are the same or different, each of which is a $C_1$-$C_{20}$ linear or branched alkyl, alkenyl, cycloalkyl, aryl, aralkyl or alkaryl group, and optionally comprises a hetero atom; at least two of $R^3$-$R^6$ are different from hydrogen and are selected from $C_1$-$C_{20}$ linear or branched alkyl, alkenyl, cycloalkyl, aryl, aralkyl and alkaryl, optionally, a hetero atom is included, and in addition, the groups $R^3$-$R^6$ may be bonded together to form a ring.

8. The solid catalyst component according to claim 4, wherein the electron donor B is an ester compound selected from the group consisting of diol ester compounds of the general formula (VII):

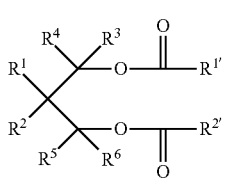

general formula (VII)

wherein $R^1$-$R^6$, $R^{1'}$-$R^{2'}$ are the same or different hydrogen, halogen or a substituted or unsubstituted linear or branched $C_1$-$C_{20}$ alkyl, $C_3$-$C_{20}$ cycloalkyl, $C_6$-$C_{20}$ aryl, $C_7$-$C_{20}$ alkaryl, $C_7$-$C_{20}$ aralkyl, $C_2$-$C_{10}$ alkenyl or $C_{10}$-$C_{20}$ fused ring aryl; but $R^{1'}$ and $R^{2'}$ are not hydrogen, and one or more of $R^1$-$R^6$ optionally form a ring.

9. The solid catalyst component according to claim 2, wherein the molar ratio of the first electron donor A and the second electron donor B is 0.05-20.

10. The solid catalyst component according to claim 1, comprising a titanium compound, a magnesium compound and an electron donor, the precursor of said magnesium compound is selected from at least one of: $X_nMg(OR)_{2-n}$, $MgCl_2 \cdot mROH$, $R_{2-n}MgX_n$, $MgCl_2/SiO_2$, $MgCl_2/Al_2O_3$ or mixture of magnesium halide and titanium alkoxide, wherein m is a number from 0.1 to 6, $0 \leq n \leq 2$, X is halogen, R is $C_1$-$C_{20}$ hydrocarbon group; said titanium compound is represented by general formula $TiX_N(OR)_{4-N}$, wherein R is $C_1$-$C_{20}$ hydrocarbon group, X is halogen, N=1-4.

11. A catalyst for olefin $CH_2$=CHR polymerization, in which R is hydrogen or hydrocarbon group having 1-12 carbon atoms, wherein the catalyst comprises the reaction product of the following components:
(a) the catalyst component according to claim 1;
(b) at least one organic aluminum compound of the general formula $AlR_nX_{(3-n)}$, wherein R is hydrogen, hydrocarbon group having 1-20 carbon atoms; X is halogen, n is an integer of 0<n<3; and, optionally,
(c) at least one siloxane compound selected from the general formula of the formula $R_nSi(OR_1)_{4-n}$ as an external electron donor compound, wherein R and $R_1$ are a $C_1$-$C_{18}$ hydrocarbon group, optionally a hetero atom is included; n is an integer of 0<n<3.

12. A method for the polymerization of olefins $CH_2$=CHR, comprising homopolymerization, prepolymerization and copolymerization, wherein R is hydrogen or a hydrocarbyl group having 1 to 12 carbon atoms, the method is carried out in the presence of the catalyst according to claim 11.

13. The solid catalyst component according to claim 4, wherein the electron donor B is selected from the group consisting of a diether, an ester, a diketone, and a diamine.

14. The solid catalyst component according to claim 1, wherein the first electron donor is selected from the group consisting of:

2-benzylimine-phenyl benzoate,
2-dibenzylimine-phenyl isobutyrate,
2-phenylethylimine-phenyl cyclohexanecarboxylate,
2-n-hexaneimine-phenyl phenoxycarboxylate,
2-n-butylimine-4-methyl-phenyl n-octyloxycarboxylate,
2-benzimide-4-ethyl-phenyl p-methoxybenzoate,
2-benzylimine-4-tert-butyl-phenyl benzoate,
2-p-chlorobenzylimine-4-tert-butyl-phenyl p-chlorobenzoate,
2-cyclohexylmethylimine-4-tert-butyl-phenyl benzoate,
2-dibenzylimine-4-methyl-6-methyl-phenyl benzoate,
2-m-chlorobenzyliimine-4-chloro-phenyl m-chlorobenzoate, and
1-benzylimine-2-naphthyl benzoate.

* * * * *